United States Patent
Matsumura et al.

(10) Patent No.: US 12,557,098 B2
(45) Date of Patent: Feb. 17, 2026

(54) TERMINAL, RADIO COMMUNICATION METHOD, AND BASE STATION FOR TRANSMITTING HARQ-ACK

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 511 days.

(21) Appl. No.: 17/916,712

(22) PCT Filed: Apr. 8, 2020

(86) PCT No.: PCT/JP2020/015828
§ 371 (c)(1),
(2) Date: Oct. 3, 2022

(87) PCT Pub. No.: WO2021/205570
PCT Pub. Date: Oct. 14, 2021

(65) Prior Publication Data
US 2023/0147173 A1 May 11, 2023

(51) Int. Cl.
*H04W 72/1273* (2023.01)
*H04L 1/00* (2006.01)
*H04L 1/08* (2006.01)
*H04W 72/23* (2023.01)

(52) U.S. Cl.
CPC ....... *H04W 72/1273* (2013.01); *H04L 1/0038* (2013.01); *H04L 1/08* (2013.01); *H04W 72/23* (2023.01)

(58) Field of Classification Search
CPC .......... H04W 72/1273; H04W 72/23; H04L 1/0038; H04L 1/08
See application file for complete search history.

(56) References Cited

U.S. PATENT DOCUMENTS

2018/0049060 A1 2/2018 Fujishiro et al.
2019/0306865 A1* 10/2019 Medles ............ H04W 72/0446
(Continued)

FOREIGN PATENT DOCUMENTS

| JP | 2023-508933 A | 3/2023 |
| WO | 2016/163548 A1 | 10/2016 |
| WO | 2021-133238 A1 | 7/2021 |

OTHER PUBLICATIONS

Office Action issued in Chinese Application No. 202080101840.0, dated Jun. 24, 2024 (12 pages).
(Continued)

*Primary Examiner* — Sulaiman Nooristany
(74) *Attorney, Agent, or Firm* — Osha Bergman Watanabe & Burton LLP

(57) ABSTRACT

A terminal according to an aspect of the present disclosure includes a receiving section that receives an initial transmission of downlink (DL) data, the DL data being scheduled based on first downlink control information (DCI) and multicasted, and a control section that controls reception of a retransmission of the DL data based on a result of decoding the initial transmission, the DL data being scheduled based on second DCI and unicasted. According to an aspect of the present disclosure, a HARQ-ACK in response to a multicast PDSCH can be appropriately transmitted.

7 Claims, 18 Drawing Sheets

(56) References Cited

U.S. PATENT DOCUMENTS

2021/0105705 A1* 4/2021 Dimou ................ H04L 5/0053
2023/0019024 A1* 1/2023 Stare .................... H04W 72/30

OTHER PUBLICATIONS

Office Action issued in counterpart Japanese Patent Application No. 2022-513772 mailed on Jan. 16, 2024 (8 pages).
International Search Report issued in PCT/JP2020/015828 on Nov. 2, 2020 (2 pages).
Written Opinion of the International Searching Authority issued in PCT/JP2020/015828 on Nov. 2, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

| DCI FIELD 1 | |
|---|---|
| DCI CODE POINT | VALUE |
| 00 | #1 |
| 01 | #2 |
| 10 | #3 |
| 11 | #4 |

| DCI FIELD 2 | |
|---|---|
| DCI CODE POINT | VALUE |
| 00 | #1 |
| 01 | #2 |
| 10 | #3 |
| 11 | #4 |

| DCI FIELD 1 | | |
|---|---|---|
| DCI CODE POINT | VALUE 1 | VALUE 2 |
| 00 | #1 | #1 |
| 01 | #2 | #2 |
| 10 | #3 | #3 |
| 11 | #4 | #4 |

ID
TERMINAL, RADIO COMMUNICATION METHOD, AND BASE STATION FOR TRANSMITTING HARQ-ACK

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "6th generation mobile communication system (6G))," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), it is expected that a plurality of user terminals (User Equipment (UE)) perform communications under ultra high density and high traffic environments.

In NR, it is expected that a plurality of UEs receive the same PDSCH using multicast at the same time under such an environment.

However, in NR specifications in the past, a method for the UE to retransmit a HARQ-ACK in response to the PDSCH using multicast has not been sufficiently studied. If the method cannot be appropriately controlled, system performance decrease such as throughput reduction is likely to occur.

As such, an object of the present disclosure is to provide a user terminal, a radio communication method, and a base station capable of appropriately transmitting a HARQ-ACK in response to the PDSCH using multicast.

Solution to Problem

A terminal according to an aspect of the present disclosure includes a receiving section that receives an initial transmission of downlink (DL) data, the DL data being scheduled based on first downlink control information (DCI) and multicasted, and a control section that controls reception of a retransmission of the DL data based on a result of decoding the initial transmission, the DL data being scheduled based on second DCI and unicasted.

Advantageous Effects of Invention

According to one aspect of the present disclosure, the HARQ-ACK in response to the multicast PDSCH can be appropriately transmitted.

Figure 1:
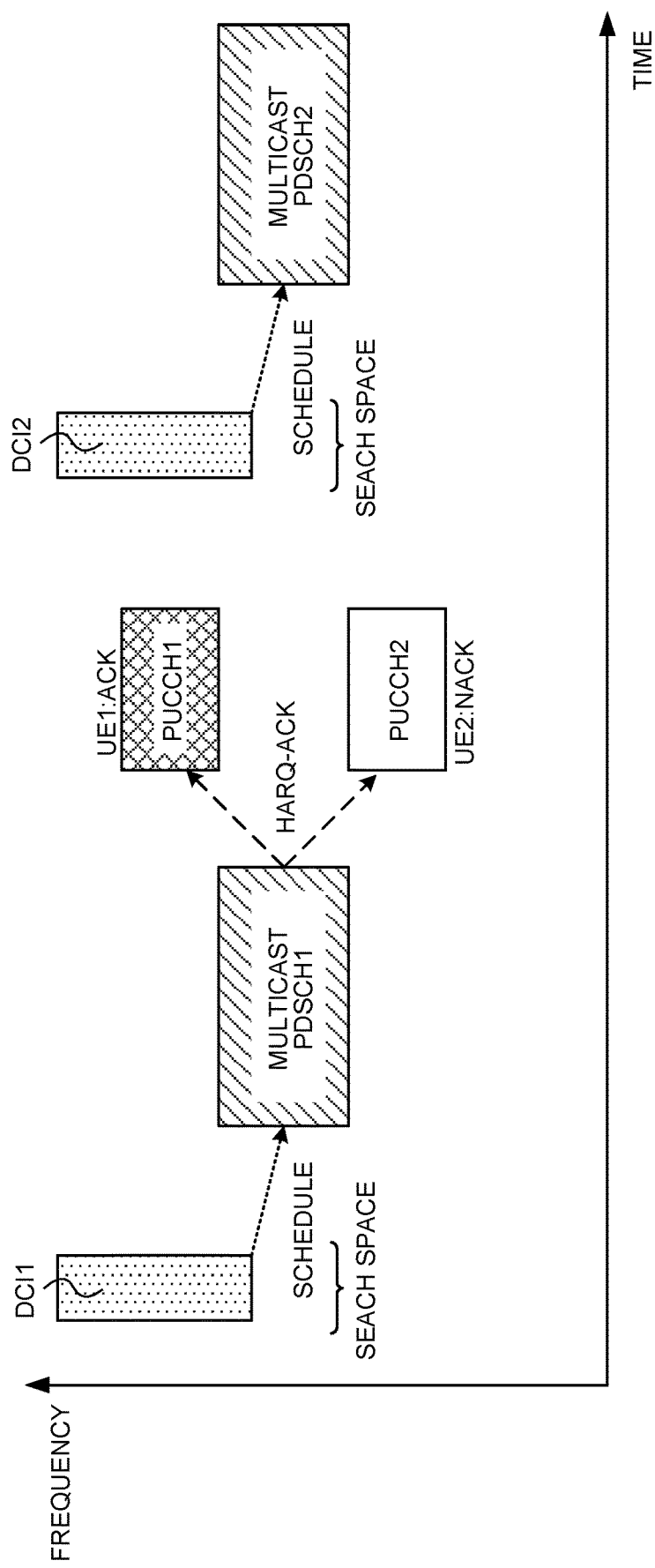
FIG. 1 is a diagram to show an example of a retransmission procedure of a multicast PDSCH.

DESCRIPTION OF EMBODIMENTS (TCI, Spatial Relation, QCL)

In NR, a study is underway to control, based on a transmission configuration indication state (TCI state), reception processing (for example, at least one of receiving, demapping, demodulating, and decoding) and transmission processing (for example, at least one of transmitting, mapping, precoding, modulating, and coding) of at least one of a signal and a channel (hereinafter, referred to as a signal/channel) in the UE.

The TCI state may represent those to be applied to a downlink signal/channel. Those corresponding to the TCI state to be applied to an uplink signal/channel may be represented as a spatial relation.

The TCI state is information relating to a quasi-co-location (QCL) of the signal/channel, and may be referred to as a spatial reception parameter, spatial relation information, and the like. The TCI state may be configured for the UE for each channel or each signal.

Note that in the present disclosure, the TCI state may be interpreted as at least one of a DL TCI state, a UL TCI state, a unified TCI state, a default TCI state, a spatial relation, a default spatial relation, a QCL, a QCL relation, QCL assumption, and a QCL type.

The QCL is an indication indicating a statistical nature of the signal/channel. For example, a case that a signal/channel and another signal/channel have a QCL relation may mean that it may be assumed that at least one of Doppler shift, Doppler spread, average delay, delay spread, and spatial parameter (for example, spatial reception parameter (spatial Rx parameter) is identical between these different plural signals/channels (or these different plural signals/channels are QCL-ed regarding at least one of these).

Note that the spatial reception parameter may correspond to a reception beam of the UE (for example, a reception analog beam), and a beam may be specified based on a spatial QCL. In the present disclosure, the QCL (or at least one element of the QCL) may be interpreted as a sQCL (spatial QCL).

For the QCL, a plurality of types (QCL types) may be defined. For example, a parameter (or parameter set) capable of being assumed to be identical may be configured to different four QCL types A to D, and these parameters (also referred to as QCL parameters) are described below.

QCL type A (QCL-A): Doppler shift, Doppler spread, average delay, delay spread,
QCL type B (QCL-B): Doppler shift and Doppler spread,
QCL type C (QCL-C): Doppler shift and average delay,
QCL type D (QCL-D): Spatial reception parameter.

The UE assuming that a certain control resource set (CORESET), channel, or reference signal is QCL-ed (for example, QCL type D) with another CORESET, channel, or reference signal may be referred to as QCL assumption.

The UE may determine at least one of a transmission beam (Tx beam) and a reception beam (Rx beam) of a signal/channel, based on the TCI state or QCL assumption of the signal/channel.

The TCI state may be, for example, information relating to QCL between a target channel (in other words, a reference signal (RS) for the channel) and another signal (for example, another RS). The TCI state may be configured (or indicated) through higher layer signaling, physical layer signaling, or a combination of these.

Note that in the present disclosure, the higher layer signaling may be, for example, any one or a combination of Radio Resource Control (RRC) signaling, Medium Access Control (MAC) signaling, broadcast information, and the like.

For example, the MAC signaling may use MAC control elements (MAC CE), MAC Protocol Data Units (PDUs), and the like. The broadcast information may be, for example, master information block (MIB), system information block (SIB), minimum system information (remaining minimum system information (RMSI)), other system information (OSI), and the like.

The physical layer signaling may be downlink control information (DCI), for example.

A channel configured (or indicated) with the TCI state or the spatial relation may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

A RS in the QCL relation with the channel may be, for example, at least one of a synchronization signal block (SSB), a channel state information reference signal (CSI-RS), a measurement reference signal (Sounding Reference Signal (SRS)), a tracking CSI-RS (also referred to as a Tracking Reference Signal (TRS)), and a QCL detection reference signal (also referred to as a QRS).

Here, the SSB is a signal block including at least one of a primary synchronization signal (PSS), a secondary synchronization signal (SSS), and a broadcast channel (Physical Broadcast Channel (PBCH)). The SSB may be also referred to as a SS/PBCH block.

TCI state information elements configured through higher layer signaling (RRC "TCI-state IE") may include one or a plurality of pieces of QCL information ("QCL-Info"). the QCL information may include at least one of information relating to the RS to be in the QCL relation (RS related information) and information indicating the QCL type (QCL type information). The RS related information may include information of an index of the RS (for example, SSB index, a non-zero-power (NZP) CSI-RS resource ID (Identifier)), an index of a cell where the RS is positioned, an index of a Bandwidth Part (BWP) where the RS is positioned. and the like.

In Rel. 15 NR, as the TCI state of at least one of a PDCCH and a PDSCH, both a QCL type A RS and a QCL type D RS, or only a QCL type A RS may be configured for the UE.

In a case that a TRS is configured as the QCL type A RS, it is assumed that an identical TRS is periodically transmitted for a long time, unlike a demodulation reference signal (DMRS) for the PDCCH or the PDSCH. The UE can measure the TRS to calculate the average delay, the delay spread, and the like.

The UE configured with the TRS as the QCL type A RS in the TCI state of the DMRS for the PDCCH or the PDSCH can assume that the DMRS for the PDCCH or the PDSCH is the same as the parameter of the QCL type A of the TRS (average delay, delay spread, and the like), and thus, can find the parameter of the type A (average delay, delay spread, and the like) of the DMRS for the PDCCH or the PDSCH from a result of measuring the TRS. The UE, in channel estimation for at least one of the PDCCH and the PDSCH, can make more accurate channel estimation by using the result of measuring the TRS.

The UE configured with the QCL type D RS can determine the UE reception beam (spatial domain reception filter, UE spatial domain reception filter) by using the QCL type D RS.

A QCL type X RS in the TCI state may refer to a RS QCL-ed type X with (a DMRS of) a channel/signal, and this RS may be referred to as a QCL source for the QCL type X in the TCI state.

(Default TCI State/Default Spatial Relation/Default PL-RS)

In a RRC connection mode, in both a case that TCI information in the DCI (higher layer parameter TCI-PresentInDCI) is set to be "enabled" and a case that TCI information in the DCI is not configured, in a case that a time offset between reception of DL DCI (DCI for scheduling the PDSCH) and a corresponding PDSCH (PDSCH scheduled by the DCI) is smaller than a threshold (timeDurationForQCL) (application condition, a first condition), in a case of non cross-carrier scheduling, a TCI state (default TCI state) for the PDSCH may be a TCI state of the lowest CORESET ID of the most recent slot in an active DL BWP on a CC thereof (of a specific UL signal). If this is not the case, a TCI state (default TCI state) for a DSCH may be a TCI state of the lowest TCI state ID for the PDSCH in an active DL BWP of a scheduled CC.

In Rel. 15, the respective MAC CEs of PUCCH spatial relation activation/deactivation MAC CE and SRS spatial relation activation/deactivation MAC CE are required. The PUSCH spatial relation complies with the SRS spatial relation.

In Rel. 16, at least one of PUCCH spatial relation activation/deactivation MAC CE and SRS spatial relation activation/deactivation MAC CE may not be used.

In FR 2, in a case that both a spatial relation and a PL-RS for a PUCCH are not configured (application condition, a second condition), default assumptions for the spatial relation and the PL-RS (default spatial relation and default PL-RS) are applied to the PUCCH. In FR2, in a case that both a spatial relation and a PL-RS for SRS (an SRS resource for the SRS, or an SRS resource corresponding to an SRI in DCI format 0_1 for scheduling the PUSCH) are not configured (application condition, the second condition), default assumptions for the spatial relation and the PL-RS (default spatial relation and default PL-RS) are applied to the PUSCH scheduled by DCI format 0_1 and the SRS.

In a case that a CORESET is configured in the active DL BWP on the CC, the default spatial relation and the default PL-RS may be a TCI state or QCL assumption of a CORESET having the lowest CORESET ID in the active DL BWP. In a case that a CORESET is not configured in the active DL BWP on the CC, the default spatial relation and the default PL-RS may be an active TCI state having the lowest ID of the PDSCH in the active DL BWP.

In Rel. 15, the spatial relation for a PUSCH scheduled by DCI format 0_0 complies with the spatial relation for a PUCCH resource having the lowest PUCCH resource ID in the active spatial relation for the PUCCH on the same CC. The network needs to update the PUCCH spatial relations on all the SCell even in a case that the PUCCH is not transmitted on the SCell.

In Rel. 16, PUCCH configuration for the PUSCH scheduled by DCI format 0_0 is not required. In a case that for a PUSCH scheduled by DCI format 0_0, no active PUCCH spatial relation or no PUCCH resource is on the active UL BWP in the CC thereof (application condition, the second condition), the default spatial relation and the default PL-RS are applied to the PUSCH.

(NR Multicast/Broadcast)

In NR in Rel. 16 and prior to Rel. 16, transmission of at least one of the signal and the channel from the NW to the UE (hereinafter, referred to as the signal/channel) is basically unicast transmission. In this case, it is assumed that the same downlink (DL) data signal/channel (for example, downlink shared channel (PDSCH)) transmitted from the NW to a plurality of UEs is received by each UE by using a plurality of reception occasions corresponding to a plurality of beams (or panels) of the NW.

A case is assumed that under ultra high density and high traffic circumstances where a large number of UEs geographically closely exist (for example, a stadium or the like), a plurality of UEs receive the same signal/channel at the same time. In such a case, if a plurality of UEs exist in the same area, the respective UEs receiving, in order to receive the same signal/channel, the signal/channel through unicast may ensure communication reliability, but reduce resource use efficiency.

On the other hand, there also exist a use case (for example, television, radio, or the like) of performing multicast (broadcast) for transmitting the same DL data signal/channel to a plurality of UEs. However, in that use case, the NW does not perform reception confirmation of the DL data signal/channel for each UE, and thus, the reliability has been difficult to ensure.

Then, the inventors of the present invention came up with a reception method of downlink control information (DCI) for scheduling a PDSCH using multicast, and a transmission method of transmission confirmation information in response to the PDSCH using multicast (for example, Hybrid Automatic Repeat reQuest ACKnowledgement (HARQ-ACK) information, which may be referred to as HARQ-ACK, ACK/NACK).

Hereinafter, embodiments according to the present disclosure will be described in detail with reference to the drawings. The radio communication method according to each embodiment may be employed independently or may be employed in combination.

(Radio Communication Method)

Multicast/broadcast may be configured for a plurality of UEs from the NW. The configuration of the multicast/broadcast may be through higher layer signaling.

The UE configured with the multicast/broadcast may receive a PDSCH scheduled by the DCI (PDCCH) that is blind detected (received) in at least one of a downlink control channel (PDCCH) monitoring occasion, a search space, and a control resource set (CORESET) corresponding to the multicast/broadcast. The PDSCH may be referred to as a PDSCH using multicast.

Furthermore, the UE configured with multicast/broadcast may transmit a HARQ-ACK/NACK in response to the PDSCH using multicast by using a PUCCH or a PUSCH.

As for the HARQ-ACK/NACK, 1-bit HARQ-ACK/NACK may be transmitted per one transport block (TB)/codeword (CW) of the PDSCH using multicast, or 1-bit HARQ-ACK/NACK may be transmitted per a plurality of TBs/CWs.

In the present disclosure, the multicast may be interpreted as broadcast (broadcast information). The PDSCH using multicast may be interpreted as a PDSCH common to a plurality of UEs, a common PDSCH, a shared PDSCH, a multicast PDSCH, a broadcast PDSCH, and the like.

Note that A/B may refer to at least one of A and B.

In the present disclosure, a HARQ-ACK transmission PUCCH/PUSCH resource with respect to the multicast PDSCH may be referred to simply as a HARQ-ACK transmission resource.

In the present disclosure, each of a plurality of UEs may be referred to as each UE, or simply a UE.

In the present disclosure, a DCI format dedicated to the multicast PDSCH may be newly defined. In a case that the multicast PDSCH is schedule by a DCI format dedicated to the multicast PDSCH, the UE may report UE capability information (UE Capability) regarding whether or not the DCI format dedicated to the multicast PDSCH is supported to the network (NW, for example, gNB). In this case, since a combination of DCI sizes (payload size, the number of bits) increases, the number of DCI blind detections performed by the UE increases, and UE operation complexity increases, only the UE supporting the DCI format may monitor the DCI format.

In the present disclosure, the multicast PDSCH may be interpreted as reception occasion, occasion, downlink (DL) data, data, transport block (TB), codeword (CW), PDSCH, multicast PUSCH, PUSCH, and the like.

Each of a plurality of pieces of DCI may schedule one or more multicast PDSCHs (reception occasions). The same DL data may be transmitted to a plurality of UEs on each of one or more multicast PDSCHs. In the present disclosure, each of the plurality of pieces of DCI may be referred to as UE-specific DCI.

One piece of DCI using QCL #x may schedule DL data having QCL #x' for a plurality of UEs.

DCI detected in a PDCCH monitoring occasion associated with (corresponding to) a QCL may schedule DL data in a reception occasion associated with the QCL.

PDCCH monitoring in a plurality of pieces of DCI may comply with at least one of PDCCH monitoring methods 1 to 3 described below.

[PDCCH Monitoring Method 1]

A plurality of pieces of DCI may be transmitted (received) in the common search space or a group common search space. The UE may select a PDCCH monitoring occasion corresponding to a QCL configured/indicated for a PDCCH, for receiving the DCI.

[PDCCH Monitoring Method 2]

The common search space or the group common search space may be configured for each of a plurality of QCLs. The UE may select a search space corresponding to a QCL configured/indicated for a PDCCH, for receiving the DCI.

[PDCCH Monitoring Method 3]

A common CORESET or a group common CORESET may be configured for each of a plurality of QCLs. The UE may select a search space corresponding to a QCL configured/indicated for a PDCCH, for receiving the DCI.

The UE monitors a search space for group scheduling configured as the common search space or the group common search space to detect the DCI.

The search space for group scheduling may differ depending on the QCL assumption. For example, the search space for group scheduling may include different time domain resources (symbol, slot, and the like) depending on the QCL assumption.

The UE may assume that the same DL data is scheduled in the search space for group scheduling in each PDCCH monitoring occasion (or the DCI in each PDCCH monitoring occasion).

The UE may be configured with the search space for group scheduling through higher layer signaling.

In the present disclosure, UE-specific (or UE-dedicated) DCI may be cyclic redundancy check (CRC)-scrambled with a UE-specific radio network temporary identifier (RNTI) (for example, cell (C-) RNTI) or, may be CRC-scrambled with a UE-common RNTI. The UE-specific DCI may be CRC-scrambled with a RNTI dedicated to multicast/broadcast schedule.

One piece of DCI for a plurality of UEs may schedule the DL data for the plurality of UEs. One piece of DCI may schedule the same DL data in one or more multicast PDSCHs. In the present disclosure, the one piece of DCI may be referred to as UE-common DCI.

The DCI may be transmitted in the common search space, or in the group common search space. The PDCCH monitoring occasion for the DCI may differ depending on the QCL used by the UE. The UE may select the PDCCH monitoring occasion based on a plurality of QCL assumptions.

One piece of DL data may be one codeword (CW), or one transport block (TB). The same DL data may have the same size (for example, a transport block size (TBS)), or a different size.

A base station may be assumed to not transmit the DL data using a plurality of beams at the same time.

In the present disclosure, the DCI common to a plurality of UEs (UE-common DCI) may be CRC-scrambled with the UE-specific RNTI (for example, C-RNTI), or the UE-common RNTI. The UE-specific DCI may be CRC-scrambled with the RNTI dedicated to multicast/broadcast schedule.

In the present disclosure, a search space dedicated to multicast/broadcast schedule may be the search space for group scheduling configured as the common search space or the group common search space.

First Embodiment

The multicast PDSCH may not be retransmitted. In other words, the NW may not retransmit the multicast PDSCH regardless of whether or not a plurality of UEs succeed or fail in the reception processing (for example, demodulating, decoding) of the multicast PDSCH. In this case, the UE may perform the reception processing of the multicast PDSCH assuming that the multicast PDSCH is not retransmitted.

In the case that the multicast PDSCH retransmission is not performed, regarding a new data indicator (NDI) included in the downlink control information (DCI) having scheduled the multicast PDSCH (scheduling DCI, for example, DCI format 1_0, 1_1), the UE may assume that a value of a field of the NDI is a certain value (for example, 1), or may ignore the NDI field value. At this time, the UE may determine that the multicast PDSCH is of an initial transmission based on the certain value (for example, 1). The UE may receive the multicast PDSCH independently from the NDI field value (or without using the NDI field value).

In the case that the multicast PDSCH retransmission is not performed, in a case that a multicast is configured for a plurality of UEs through higher layer signaling, the NDI field may not be included in the scheduling DCI for the multicast PDSCH. In other words, in a case that a multicast is configured with through higher layer signaling, a plurality of UEs may receive the scheduling DCI for the multicast PDSCH that does not including the NDI field.

The DCI format dedicated to the multicast PDSCH may not include the NDI field. In other words, a plurality of UEs may receive the multicast PDSCH that is scheduled by the DCI format dedicated to the multicast PDSCH not including the NDI field.

The DCI scrambled with the RNTI dedicated to multicast schedule may not include the NDI field. In other words, in a case that the scheduling DCI for the multicast PDSCH is scrambled with the RNTI dedicated to multicast schedule, a plurality of UEs may not receive the multicast PDSCH scheduled by the DCI format not including the NDI field.

At this time, the DCI scrambled with a RNTI other than the RNTI dedicated to multicast schedule may have a structure including the NDI field, or a structure not including the NDI field.

In the case that the multicast PDSCH retransmission is not performed, a plurality of UEs may not transmit a HARQ-ACK (at least one of ACK and NACK) for the multicast PDSCH.

As described above, according to the first embodiment, under a circumstance where the multicast PDSCH is transmitted, power consumption for the HARQ-ACK transmission PUCCH/PUSCH resource and the UE can be reduced.

Second Embodiment

The multicast PDSCH may be retransmitted by use of multicast/broadcast. In other words, the NW may transmit one piece of data on the multicast PDSCH, and may retransmit the one piece of data by use of multicast/broadcast with respect to a failure in the reception processing (for example, demodulating, decoding) of the multicast PDSCH by any of a plurality of UEs. In this case, the UE may perform the reception processing of the multicast PDSCH assuming that the data transmitted using the initial transmission multicast PDSCH is retransmitted by use of multicast/broadcast.

Note that in the present disclosure, the multicast PDSCH retransmitted by use of multicast/broadcast may be simply referred to as a retransmission multicast PDSCH.

In the present disclosure, the multicast PDSCH in the initial transmission may be interpreted as a first multicast PDSCH, an initial transmission multicast PDSCH, and the like. The retransmission multicast PDSCH may be interpreted as a second multicast PDSCH.

In the present disclosure, the scheduling DCI for the initial transmission multicast PDSCH may be referred to as first DCI. In the present disclosure, the scheduling DCI for the retransmission multicast PDSCH may be referred to as second DCI. The first DCI and the second DCI may be different DCI.

In the present disclosure, each of the first DCI and the second DCI may be the UE-specific DCI, or the DCI common to a plurality of UEs.

In the present disclosure, the search space for monitoring the UE-specific DCI may be a common search space, or a UE-specific search space. The search space for monitoring the UE-specific DCI may be a search space dedicated to multicast/broadcast schedule (or a control resource set (CORESET)).

In the present disclosure, the search space for monitoring the UE-common DCI may be a common search space, or a UE-specific search space. The search space for monitoring the UE-common DCI may be a search space dedicated to multicast/broadcast schedule (or a control resource set (CORESET)).

In the present disclosure, the UE-specific DCI may be cyclic redundancy check (CRC)-scrambled with a UE-specific RNTI (for example, cell (C-) RNTI), or a UE-common RNTI. The UE-specific DCI may be CRC-scrambled with the RNTI dedicated to multicast/broadcast schedule.

In the present disclosure, the UE-common DCI may be CRC-scrambled with a UE-specific RNTI (for example, C-RNTI), or a UE-common RNTI. The UE-common RNTI may be a newly defined RNTI. The UE-specific DCI may be CRC-scrambled with a RNTI dedicated to multicast/broadcast schedule.

Embodiment 2-1

In the following, a case that the retransmission multicast PDSCH is scheduled by the second DCI will be described.

In the case that the retransmission multicast PDSCH is scheduled by the second DCI, the first DCI may be associated with the second DCI. For example, at least one of the DCI format, the RNTI, a control channel element (CCE) index/aggregation level of the PDCCH carrying the DCI, and the search space/control resource set (CORESET) of the first DCI and the second DCI may be common.

The respective NDI fields in the first DCI and the second DCI may be limited to certain values. At this time, the NDI field value in the first DCI may be N (for example, 1). The NDI field value in the second DCI may be M (for example, 0). The NDI field value in the first DCI and the NDI field value in the second DCI may be different from each other.

FIG. 1 is a diagram to show an example of a retransmission procedure of a multicast PDSCH. In FIG. 1, a plurality of UEs (a UE 1 and a UE 2) receive a multicast PDSCH 1 scheduled by DCI 1. The multicast PDSCH 1 is a PDSCH carrying one piece of DL data (which may be simply referred to as data). The UE 1 succeeding in the reception processing of the PDSCH 1 transmits a positive acknowledgement (HARQ-ACK or ACK simply) by using a PUCCH 1, and the UE 2 failing in the reception processing of the PDSCH 1 transmits a negative acknowledgement (HARQ-NACK or NACK simply) by using a PUCCH 2. After that, the UE receives a PDSCH 2 using multicast, the PDSCH 2 being scheduled by DCI 2. The multicast PDSCH 2 is a PDSCH carrying data the same as the data carried by the multicast PDSCH 1.

Note that the number of UEs, the DCI, the PDSCH, the number of PUCCH resources, and time/frequency allocation positions shown in FIG. 1 are merely examples, and are not limited thereto. The DCI 1 and the DCI 2 in FIG. 1 may be UE-common DCI, or UE-specific DCI. A HARQ-ACK transmission resource with respect to the multicast PDSCH may be a UE-common HARQ-ACK transmission resource, or a PUSCH resource.

Note that in the drawings shown in the present disclosure, the initial transmission multicast PDSCH and the retransmission multicast PDSCH may be a PDSCH carrying the same DL data. Multicast PDSCH repetition may be a multicast PDSCH carrying the same DL data.

The UE succeeding in the reception processing of the multicast PDSCH (or the UE transmitting the ACK in response to the multicast PDSCH) may not be required to monitor the second DCI. The UE succeeding in the reception processing of the multicast PDSCH may not be required to receive the retransmission multicast PDSCH, or may not transmit the HARQ-ACK information with respect to the multicast PDSCH.

In this case, the UE may not transmit the HARQ-ACK in response to the retransmission multicast PDSCH. The UE may transmit the ACK in response to the retransmission multicast PDSCH regardless of a result of receiving the retransmission multicast PDSCH. This can avoid a HARQ-ACK reception error of the NW.

The UE failing in the reception processing of the multicast PDSCH (or the UE transmitting the NACK in response to the multicast PDSCH) may monitor the second DCI to receive the retransmission multicast PDSCH.

In this case, the UE may transmit the ACK/NACK based on the result of receiving the retransmission multicast PDSCH. In a case that a predefined/configured upper limit of multicast PDSCH retransmission number is reached, the UE may not transmit the ACK/NACK in response to the multicast PDSCH. The upper limit of multicast PDSCH retransmission number may be predefined by the specifications, or configured for the UE through higher layer signaling.

Embodiment 2-2

In the following, a case that the retransmission multicast PDSCH is scheduled by the DCI for scheduling the initial transmission multicast PDSCH (the first DCI) will be described.

In the case that the retransmission multicast PDSCH is transmitted by use of multicast, the DCI for scheduling the initial transmission multicast PDSCH (the first DCI) may schedule the retransmission multicast PDSCH. In other words, the UE may receive the initial transmission multicast PDSCH and the retransmission multicast PDSCH which are scheduled by one piece of scheduling DCI. This can reduce the overhead for receiving the scheduling DCI for the retransmission multicast PDSCH.

In this case, regardless of a result of receiving the initial transmission multicast PDSCH, the UE may or may not transmit the HARQ-ACK information with respect to the initial transmission multicast PDSCH.

Note that in the present disclosure, the retransmission multicast PDSCH may be transmitted one time or a plurality of times. The upper limit (maximum number) of multicast PDSCH retransmission number may be predefined by the specifications, may be configured for the UE through higher layer signaling, or may be a value reported to the NW in UE capability information (UE capability).

In this case, the value of the NDI field included in the first DCI may be a certain value (for example, 1). In a case that multicast is configured for a plurality of UEs, the UE may assume (interpret) that the value of the NDI field included in the first DCI is a certain value (for example, 1) to receive the multicast PDSCH. There may be no value of the NDI field included in the first DCI.

Figure 2:
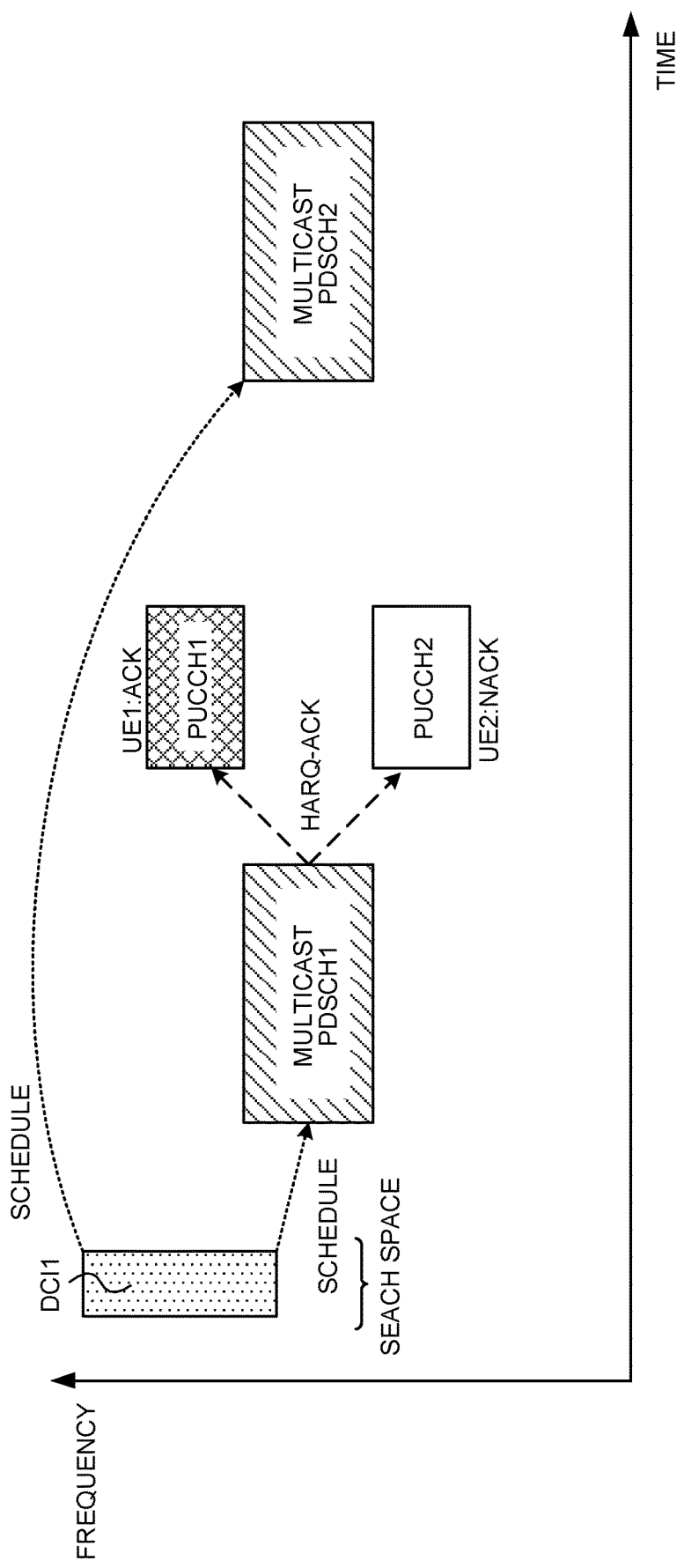
FIG. 2 a diagram to show another example of the retransmission procedure of the multicast PDSCH.

FIG. 2 a diagram to show another example of the retransmission procedure of the multicast PDSCH. In FIG. 2, a plurality of UEs (a UE 1 and a UE 2) receive a multicast PDSCH 1 scheduled by the DCI 1. In FIG. 2, the UE 1 succeeding in the reception processing of the PDSCH 1 transmits a positive acknowledgement (HARQ-ACK or ACK simply) by using a PUCCH 1, and the UE 2 failing in the reception processing of the PDSCH transmits a negative acknowledgement (HARQ-NACK or NACK simply) by using a PUCCH 2, but the ACK/NACK may not be transmitted. After that, the UE receives a PDSCH 2 using multicast, the PDSCH 2 being scheduled by the DCI 1.

Note that the number of UEs, the DCI, the PDSCH, the number of PUCCH resources, and time/frequency allocation positions shown in FIG. 2 are merely examples, and are not limited thereto. The DCI 1 in FIG. 2 may be UE-common DCI, or UE-specific DCI. A HARQ-ACK transmission resource with respect to the multicast PDSCH may be a UE-common HARQ-ACK transmission resource, or a PUSCH resource.

The UE succeeding in the reception processing of the multicast PDSCH (or the UE transmitting the ACK in response to the multicast PDSCH) may not be required to receive the retransmission multicast PDSCH, or may not transmit the HARQ-ACK information with respect to the multicast PDSCH.

In this case, the UE may not transmit the HARQ-ACK in response to the retransmission multicast PDSCH. The UE may transmit the ACK in response to the retransmission multicast PDSCH regardless of a result of receiving the retransmission multicast PDSCH.

The UE failing in the reception processing of the multicast PDSCH (or the UE transmitting the NACK in response to the multicast PDSCH) may receive the retransmission multicast PDSCH.

In this case, the UE may transmit the ACK/NACK based on the result of receiving the retransmission multicast PDSCH. In a case that a predefined/configured upper limit of multicast PDSCH retransmission number is reached, the UE may not transmit the ACK/NACK in response to the multicast PDSCH. The upper limit of multicast PDSCH retransmission number may be predefined by the specifications, or configured for the UE through higher layer signaling.

In the following, resource indication for the retransmission multicast PDSCH by way of the scheduling DCI for the initial transmission multicast PDSCH will be described. The UE may receive information relating to a resource for the retransmission multicast PDSCH included in the scheduling DCI for the initial transmission multicast PDSCH.

In a case that the retransmission multicast PDSCH is scheduled by way of the scheduling DCI for the initial transmission multicast PDSCH, a DCI field for the resource indication for the multicast PDSCH may be extended.

Specifically, a correspondence relation (table) between a DCI code point and at least one of time domain resource assignment (TDRA) and frequency domain resource assignment (FDRA) of the multicast PDSCH is applied to each of the initial transmission multicast PDSCH and the retransmission multicast PDSCH, and the correspondence relation is notified/prescribed to the UE, and the UE may determine a resource for the initial transmission/retransmission multicast PDSCH based on the DCI code point included in the scheduling DCI. The correspondence relation (table) may be predefined by the specifications, or notified to the UE through higher layer signaling.

Figures 3A, 3B, 3C:
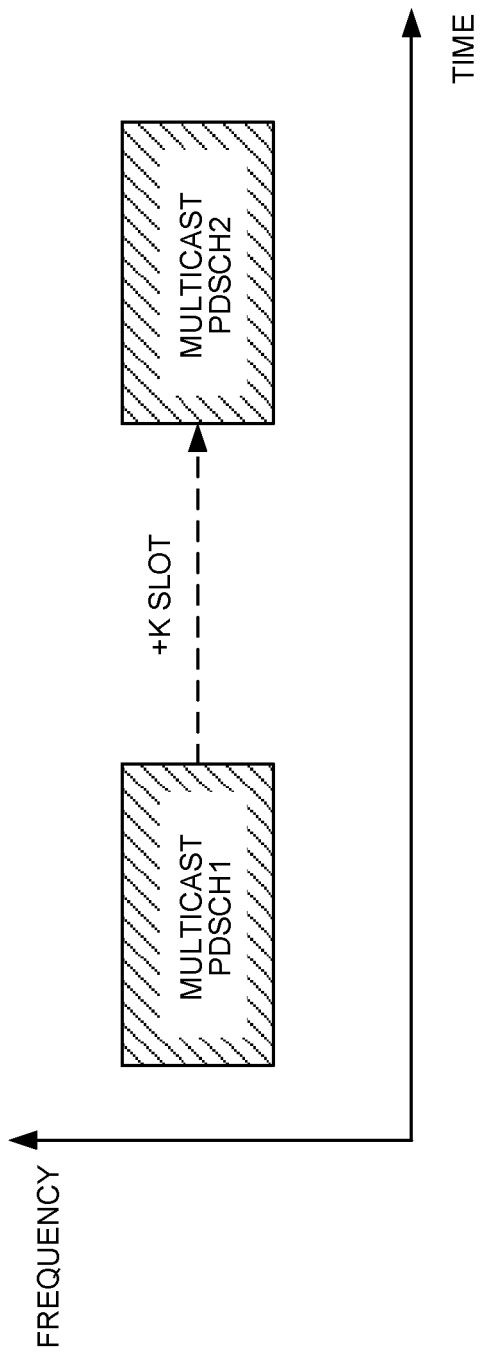
FIGS. 3A to 3C are diagram to show examples of resource indication by way of DCI for an initial transmission multicast PDSCH and a retransmission multicast PDSCH.

FIG. 3A is a diagram to show an example of the resource indication by way of the DCI for each of the initial transmission multicast PDSCH and the retransmission multicast PDSCH. In FIG. 3A, a table (DCI field 1) for determining the initial transmission multicast PDSCH resource and a table (DCI field 2) for determining the retransmission multicast PDSCH resource are notified to/configured for the UE. The UE uses, among the PDSCH resources indicated in the DCI field 1, a PDSCH resource of a value corresponding to a first DCI code point notified by way of the scheduling DCI to receive the initial transmission multicast PDSCH. The UE uses, among the PDSCH resources indicated in the DCI field 2, a PDSCH resource of a value corresponding to a second DCI code point notified by way of the scheduling DCI to receive the retransmission multicast PDSCH. The value corresponding to each DCI code point may be associated with a TDRA/FDRA field of the multicast PDSCH.

Note that each table shown in FIG. 3A is merely an example, and the DCI code point and the value corresponding to the code point are not limited thereto.

In the case that the retransmission multicast PDSCH is scheduled by way of the scheduling DCI for the initial transmission multicast PDSCH, the DCI field for the resource indication for the multicast PDSCH may not be extended. In other words, the UE may use the resource for the initial transmission multicast PDSCH and retransmission multicast PDSCH corresponding to one DCI code point to receive the initial transmission/retransmission multicast PDSCH.

Specifically, a correspondence relation (table) between the DCI code point and the TDRA/FDRA field of the multicast PDSCH is applied to the initial transmission multicast PDSCH and the retransmission multicast PDSCH, and the correspondence relation is notified/prescribed to the UE, and the UE may determine a resource for the initial transmission and retransmission multicast PDSCHs based on one DCI code point included in the scheduling DCI. In this case, the time/frequency resource for the initial transmission multicast PDSCH and the retransmission multicast PDSCH may be the same, or different.

FIG. 3B is a diagram to show an example of the resource indication by way of the DCI for the initial transmission multicast PDSCH and the retransmission multicast PDSCH. In FIG. 3B, a table (DCI field 1) for determining the initial transmission and retransmission multicast PDSCH resources is notified to/configured for the UE. The UE uses, among the PDSCH resources indicated in the DCI field 1, a PDSCH resource of a value corresponding to a DCI code point notified by way of the scheduling DCI to receive the initial transmission multicast PDSCH and the retransmission multicast PDSCH. The value corresponding to each DCI code point may be associated with a TDRA/FDRA field of the multicast PDSCH.

Note that each table shown in FIG. 3B is merely an example, and the DCI code point and the value corresponding to the code point are not limited thereto.

In the case that the retransmission multicast PDSCH is scheduled by way of the scheduling DCI for the initial transmission multicast PDSCH, the UE may determine the time/frequency resource for the retransmission multicast PDSCH based on an offset value with respect to the time/frequency resource for the initial transmission multicast PDSCH notified (configured) by way of the scheduling DCI.

The offset value may be predefined by the specifications, or notified to the UE through higher layer signaling.

FIG. 3C is a diagram to show an example of the resource indication by way of the DCI for the initial transmission multicast PDSCH and the retransmission multicast PDSCH. The UE is notified of/prescribed a time offset value (K) from the initial transmission multicast PDSCH (multicast PDSCH 1) resource to the retransmission multicast PDSCH (multicast PDSCH 2) resource to receive the retransmission multicast PDSCH based on the offset value. In FIG. 3C, the UE receives the multicast PDSCH 2 by using the same frequency resource as the multicast PDSCH 1 K slots after the multicast PDSCH 1 resource.

Note that the example shown in FIG. 3C is merely an example, and the time offset may be a time represented by the slot/symbol from a start/end of the initial transmission multicast PDSCH resource to a start/end of the retransmission multicast PDSCH resource.

Although the example shown in FIG. 3C shows the case that the time offset is notified to/configured for the UE, the frequency offset may be notified to/configured for the UE, or the time offset and the frequency offset may be notified to/configured for the UE.

The frequency offset may be a value from a minimum/maximum/average physical resource block (PRB) of the initial transmission multicast PDSCH resource to a minimum/maximum/average PRB of the retransmission multicast PDSCH resource.

In a case that a plurality of retransmission multicast PDSCHs are configured, the UE may be notified of/configured with a time/frequency offset value for each of the retransmission multicast PDSCH resources with respect to the initial transmission multicast PDSCH resource. In a case that a plurality of retransmission multicast PDSCHs are configured, the UE may be notified of/configured with a time/frequency offset value for the retransmission multicast PDSCH resource with respect to a multicast PDSCH resource immediately before. In this case, the number of offset values may be one, or the certain number of offset values (for example, as many as the number of configured retransmission multicast PDSCHs) may be notified/prescribed to the UE.

In the following, a description is given of a method for indicating at least one of a timing from the PDSCH to the HARQ feedback (PDSCH-to-HARQ_feedback timing indicator, HARQ feedback timing) and the HARQ-ACK transmission resource in the case that the retransmission multicast PDSCH is scheduled by way of the scheduling DCI for the initial transmission multicast PDSCH.

In the case that the retransmission multicast PDSCH is scheduled by way of the scheduling DCI for the initial transmission multicast PDSCH, the scheduling DCI may include a specific field (HARQ feedback timing indicator field/another field). The relevant another field may be a field for indicating the HARQ-ACK transmission resource.

Specifically, a correspondence relation (table) between the DCI code point in the specific field and the HARQ feedback timing/HARQ-ACK transmission resource with respect to the multicast PDSCH is applied to each of the initial transmission multicast PDSCH and the retransmission multicast PDSCH, and the correspondence relation is notified/prescribed to the UE, and the UE may determine the HARQ feedback timing/HARQ-ACK transmission resource with respect to the initial transmission/retransmission multicast PDSCH based on the DCI code point included in the scheduling DCI. The correspondence relation (table) may be predefined by the specifications, or notified to the UE through higher layer signaling.

Figures 4A, 4B, 4C:
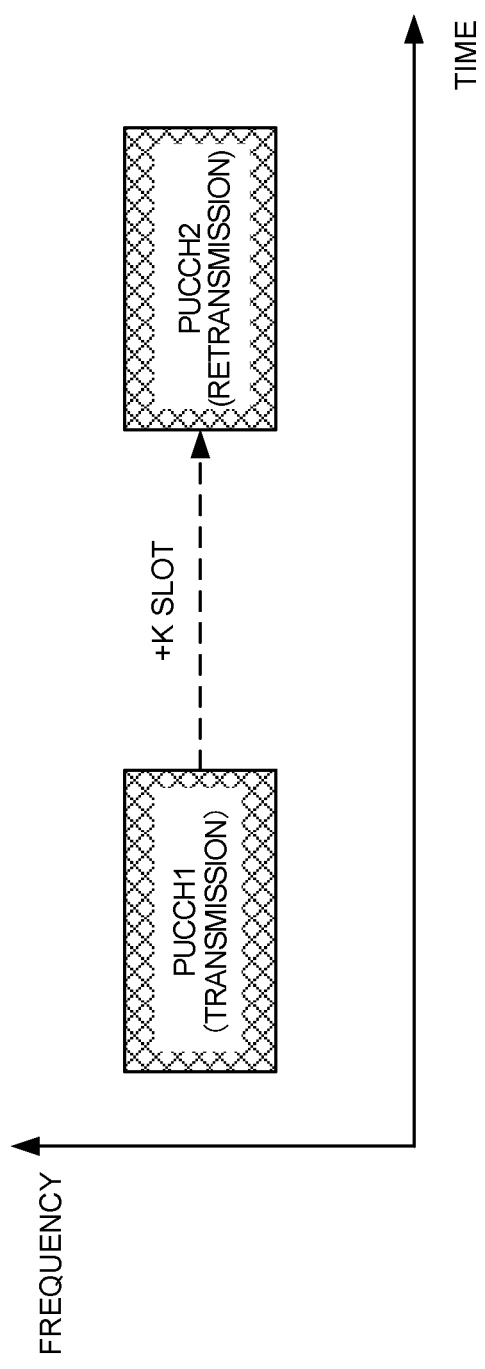
FIG. 4A to 4C are diagram to show examples of methods for determining a HARQ feedback timing/HARQ-ACK transmission resource with respect to an initial transmission multicast PDSCH and a retransmission multicast PDSCH.

FIG. 4A is a diagram to show an example of a method for determining the HARQ feedback timing/HARQ-ACK transmission resource with respect to each of the initial transmission multicast PDSCH and the retransmission multicast PDSCH. In FIG. 4A, a table (DCI field 1) for determining the HARQ feedback timing/HARQ-ACK transmission resource of a HARQ-ACK in response to the initial transmission multicast PDSCH, and a table (DCI field 2) for determining the HARQ feedback timing/HARQ-ACK transmission resource of a HARQ-ACK in response to the retransmission multicast PDSCH are notified to/configured for the UE.

In FIG. 4A, the UE uses, among the HARQ feedback timings/HARQ-ACK transmission resources indicated in the DCI field 1, a HARQ feedback timing/HARQ-ACK transmission resource of a value corresponding to a first DCI code point notified by way of the scheduling DCI to transmit a HARQ-ACK in response to the initial transmission multicast PDSCH. The UE uses, among the HARQ feedback timings/HARQ-ACK transmission resources indicated in the DCI field 2, a HARQ feedback timing/HARQ-ACK transmission resource of a value corresponding to a second DCI code point notified by way of the scheduling DCI to transmit a HARQ-ACK in response to the retransmission multicast PDSCH. The value corresponding to each DCI code point may be associated with the HARQ feedback timing/HARQ-ACK transmission resource with respect to the initial transmission/retransmission multicast PDSCH.

Note that each table shown in FIG. 4A is merely an example, and the DCI code point and the value corresponding to the code point are not limited thereto.

In the case that the retransmission multicast PDSCH is scheduled by way of the scheduling DCI for the initial transmission multicast PDSCH, the scheduling DCI may include one DCI field for indicating the HARQ feedback timing/HARQ-ACK transmission resource with respect to the multicast PDSCH. In other words, the UE may use the HARQ feedback timings/HARQ-ACK transmission resources with respect to the initial transmission multicast PDSCH and retransmission multicast PDSCH corresponding to one DCI code point to transmit the HARQ-ACKs in response to the initial transmission and retransmission multicast PDSCHs.

Specifically, a correspondence relation (table) between the DCI code point and the HARQ feedback timing/HARQ-ACK transmission resource of the HARQ-ACK in response to the multicast PDSCH is applied to each of the initial transmission multicast PDSCH and the retransmission multicast PDSCH, and the correspondence relation is notified/prescribed to the UE, and the UE may determine the HARQ feedback timings/HARQ-ACK transmission resources of the HARQ-ACKs in response to the initial transmission and retransmission multicast PDSCHs based on one DCI code point included in the scheduling DCI. In this case, the HARQ feedback timings/HARQ-ACK transmission resources of the HARQ-ACKs in response to the initial transmission multicast PDSCH and the retransmission multicast PDSCH may be the same, or different.

FIG. 4B is a diagram to show an example of the method for determining the HARQ feedback timing/HARQ-ACK transmission resource with respect to each of the initial transmission multicast PDSCH and the retransmission multicast PDSCH. In FIG. 4B, a table (DCI field 1) for determining the HARQ feedback timing/HARQ-ACK transmission resource with respect to the initial transmission multicast PDSCH is notified to/configured for the UE. The UE uses, among the HARQ feedback timings/HARQ-ACK transmission resources indicated in the DCI field 1, a HARQ feedback timing/HARQ-ACK transmission resource of a value corresponding to a DCI code point notified by way of the scheduling DCI to transmit the HARQ-ACKs in response to the initial transmission and retransmission multicast PDSCHs. The value corresponding to each DCI code point may be associated with the HARQ feedback timing/HARQ-ACK transmission resource of the HARQ-ACK in response to the multicast PDSCH.

Note that each table shown in FIG. 4B is merely an example, and the DCI code point and the value corresponding to the code point are not limited thereto.

In the case that the retransmission multicast PDSCH is scheduled by way of the scheduling DCI for the initial transmission multicast PDSCH, the UE may determine the HARQ-ACK transmission resource for the retransmission multicast PDSCH, based on an offset value with respect to the HARQ-ACK transmission resource for the initial transmission multicast PDSCH notified (configured) by way of the scheduling DCI.

The offset value may be predefined by the specifications, or notified to the UE through higher layer signaling.

FIG. 4C is a diagram to show an example of the method for determining the HARQ-ACK transmission resource with respect to the initial transmission multicast PDSCH and the retransmission multicast PDSCH. The UE is notified of/prescribed a time offset value (K) from the HARQ-ACK transmission resource (PUCCH 1) for the initial transmission multicast PDSCH to the HARQ-ACK transmission resource (PUCCH 2) for the retransmission multicast PDSCH to transmit the HARQ-ACKs in response to the initial transmission and retransmission multicast PDSCHs based on the offset value. In FIG. 4C, the UE transmits the PUCCH 2 by using the same frequency resource as the PUCCH 1 K slots after the PUCCH 1.

Note that the example shown in FIG. 4C is merely an example, and the time offset may be a time represented by the slot/symbol from a start/end of the HARQ-ACK transmission resource for the initial transmission multicast PDSCH to a start/end of the HARQ-ACK transmission resource for the retransmission multicast PDSCH.

Although the example shown in FIG. 4C shows the case that the time offset is notified to/configured for the UE, the frequency offset may be notified to/configured for the UE, or the time offset and the frequency offset may be notified to/configured for the UE.

The frequency offset may be a value from a minimum/maximum/average PRB of the HARQ-ACK transmission resource for the initial transmission multicast PDSCH to a minimum/maximum/average PRB of the HARQ-ACK transmission resource for the retransmission multicast PDSCH.

In the case that a plurality of retransmission multicast PDSCHs are configured, the UE may be notified of/configured with a time/frequency offset value of the HARQ-ACK transmission resource for each of the retransmission multicast PDSCHs with respect to the HARQ-ACK transmission resource for the initial transmission multicast PDSCH. In the case that a plurality of retransmission multicast PDSCHs are configured, the UE may be notified of/configured with a time/frequency offset value of the HARQ-ACK transmission resource for the retransmission multicast PDSCH with respect to the HARQ-ACK transmission resource for a multicast PDSCH immediately before. In this case, the number of offset values may be one, or the certain number of offset values (for example, as many as the number of configured retransmission multicast PDSCHs) may be notified/prescribed to the UE.

As described above, according to the second embodiment, even in a case that the number of UEs requiring retransmission of the multicast PDSCH is large, the retransmission is possible by using the small number of PDSCH resources, and thus, resource use efficiency can be improved.

Third Embodiment

The multicast PDSCH may be retransmitted by use of unicast. In other words, the NW may transmit one piece of data on the multicast PDSCH, and may retransmit the one piece of data by use of unicast with respect to a failure in the reception processing (for example, demodulating, decoding) of the multicast PDSCH by any of a plurality of UEs. In this case, the UE may perform the reception processing of the multicast PDSCH assuming that the multicast PDSCH is retransmitted by use of unicast.

Note that in the present disclosure, the unicast may refer to being UE-specifically transmitted in accordance with methods defined in Rel. 15 and Rel. 16.

In the present embodiment, the first DCI and the second DCI may be restricted. For example, the first DCI may be DCI dedicated to multicast/broadcast, DCI to which a DCI format dedicated to multicast/broadcast is applied, or DCI CRC-scrambled with a RNTI dedicated to multicast/broadcast. The second DCI may be DCI used for unicast (defined in Rel. 15/16), DCI to which a DCI format used for unicast is applied, or DCI CRC-scrambled with a RNTI used for unicast. The second DCI may be DCI dedicated to multicast/broadcast, DCI to which a DCI format dedicated to multicast/broadcast is applied, or DCI CRC-scrambled with a RNTI dedicated to multicast/broadcast.

In the present disclosure, a multicast DCI format may be at least one of a DCI format dedicated to multicast/broadcast and a DCI format applied to DCI CRC-scrambled with a RNTI dedicated to multicast/broadcast.

In the present disclosure, a unicast DCI may be at least one of DCI to which a DCI format defined in Rel. 15/16 is applied and DCI CRC-scrambled with a RNTI defined in Rel. 15/16.

For example, at least one of the DCI format, the RNTI, the control channel element (CCE) index/aggregation level of the PDCCH carrying the DCI, and the search space/control resource set (CORESET) may be associated with each other between the first DCI and the second DCI.

The respective NDI fields in the first DCI and the second DCI may be limited to certain values. At this time, the NDI field value in the first DCI may be N (for example, 1). The NDI field value in the second DCI may be M (for example, 0). The NDI field value in the first DCI and the NDI field value in the second DCI may be different from each other.

Figure 5:
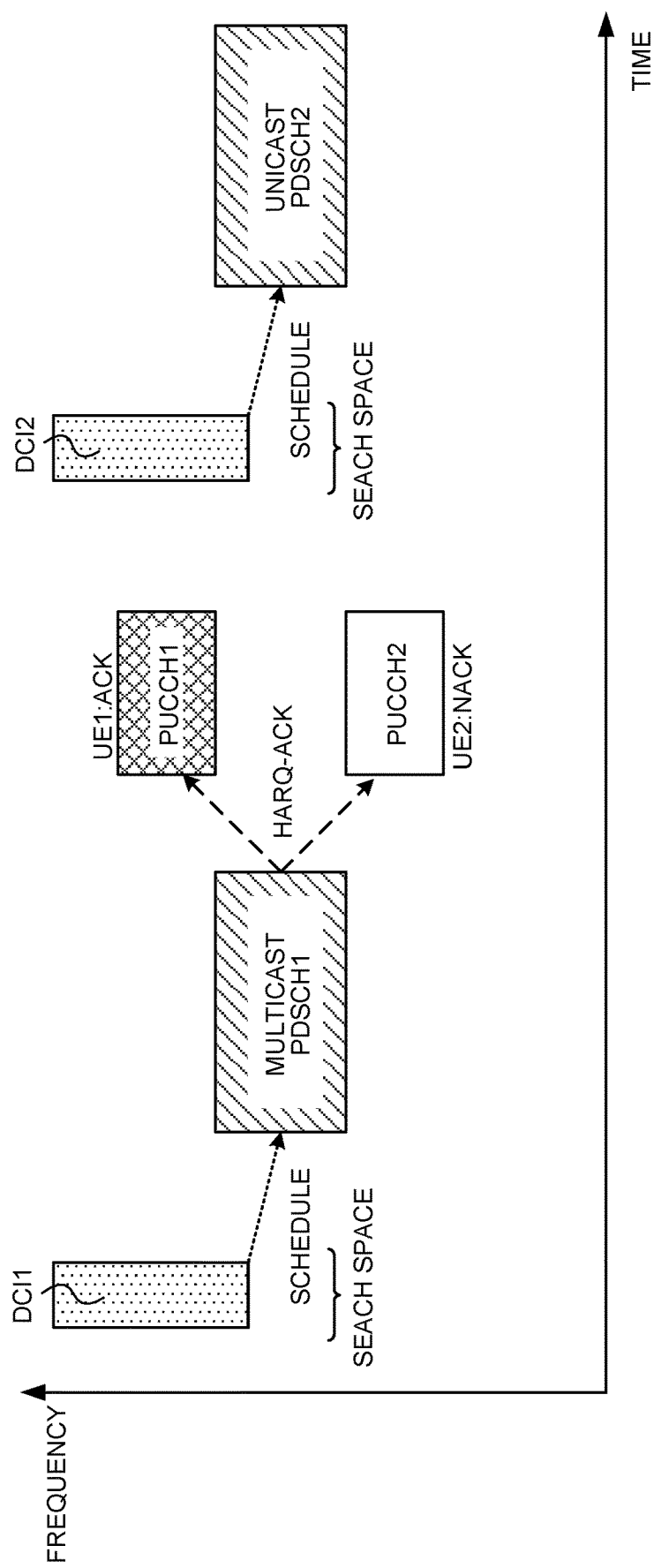
FIG. 5 is a diagram to show an example of the retransmission procedure of the multicast PDSCH.

FIG. 5 is a diagram to show an example of the retransmission procedure of the multicast PDSCH. In FIG. 5, a plurality of UEs (a UE 1 and a UE 2) receive a multicast PDSCH 1 scheduled by the DCI 1. The UE 1 succeeding in the reception processing of the PDSCH 1 transmits an ACK by using a PUCCH 1, and the UE 2 failing in the reception processing of the PDSCH transmits a NACK by using a PUCCH 2. After that, the UE receives a PDSCH 2 using unicast, the PDSCH 2 being scheduled by DCI 2.

Note that the number of UEs, the DCI, the PDSCH, the number of PUCCH resources, and time/frequency allocation positions shown in FIG. 5 are merely examples, and are not limited thereto. The DCI 1 and the DCI 2 in FIG. 5 may be UE-common DCI, or UE-specific DCI. A HARQ-ACK transmission resource with respect to the multicast PDSCH may be a UE-common HARQ-ACK transmission resource, or a PUSCH resource.

To the first DCI and the second DCI, DCI formats different from each other may be applied. Specifically, a multicast/broadcast DCI format may be applied to the first DCI. A unicast DCI format may be applied to the second DCI.

The first DCI format may be a DCI format defined in Rel. 15/16. In this case, UE may interpret a specific field among fields included in the DCI format defined in Rel. 15/16 as a multicast parameter to receive the multicast PDSCH.

At this time, in a case that HARQ process IDs included in the first DCI and the second DCI are equal to each other, and the NDI field values in the first DCI and the second DCI are different from (or equal to) each other, the UE may determine that the initial transmission multicast PDSCH scheduled by the first DCI and the retransmission multicast PDSCH scheduled by the second DCI carry the same data.

The same (common) DCI format may be applied to the first DCI and the second DCI. Specifically, the multicast/broadcast DCI format may be applied to the first DCI and the second DCI.

At this time, in the case that the HARQ process IDs included in the first DCI and the second DCI are equal to each other, and the NDI field values in the first DCI and the second DCI are different from (or equal to) each other, the UE may determine that the initial transmission multicast PDSCH scheduled by the first DCI and the retransmission multicast PDSCH scheduled by the second DCI carry the same data.

In this case, a field for notifying the UE of whether the multicast/broadcast DCI schedules a multicast PDSCH or a unicast PDSCH may be configured/defined in the relevant DCI.

That field may be an initial bit of a multicast/broadcast DCI, and the UE may use a subsequent bit as a unicast field or a multicast field based on the relevant first bit.

Additionally, in this case, regarding whether the multicast/broadcast DCI schedules the multicast PDSCH or the unicast PDSCH, the UE may implicitly make a determination based on a specific field value included in the relevant DCI and a rule applied to the specific field value.

By applying the same DCI format to the first DCI and the second DCI, the UE not requiring receiving the retransmission multicast PDSCH (for example, the UE succeeding in the reception processing of the initial transmission multicast PDSCH) does not receive the retransmission multicast PDSCH, and thus, the overhead can be suppressed.

Regardless of whether the first DCI is the same as the second DCI, the UE may be configured with a UE-specific/ UE-common retransmission DCI resource (at least one of a search space, a CORESET, and a monitoring occasion). The UE may monitor the second DCI by use of the retransmission DCI resource.

The UE succeeding in the reception processing of the multicast PDSCH (or the UE transmitting the ACK in response to the multicast PDSCH) may not be required to monitor the second DCI. The UE succeeding in the reception processing of the multicast PDSCH may not be required to receive the retransmission multicast PDSCH, or may not transmit the HARQ-ACK information with respect to the multicast PDSCH.

In this case, the UE may not transmit the HARQ-ACK information with respect to the retransmission multicast PDSCH. The UE may transmit the HARQ-ACK information indicating the ACK in response to the retransmission multicast PDSCH regardless of a result of receiving the retransmission multicast PDSCH.

The UE failing in the reception processing of the multicast PDSCH (or the UE transmitting the NACK in response to the multicast PDSCH) may monitor the second DCI to receive the retransmission multicast PDSCH.

In this case, the UE may transmit the ACK/NACK based on the result of receiving the retransmission multicast PDSCH. In the case that the predefined/configured upper limit (maximum number) of multicast PDSCH retransmission number is reached, the UE may not transmit the ACK/NACK in response to the multicast PDSCH. The upper limit of multicast PDSCH retransmission number may be predefined by the specifications, or configured for the UE through higher layer signaling.

As described above, according to the third embodiment, even in a case that the number of UEs requiring retransmission of the multicast PDSCH is small, the NW can perform the bare minimum data transmission, and thus, the resource use efficiency can be improved.

Fourth Embodiment

Figure 6:
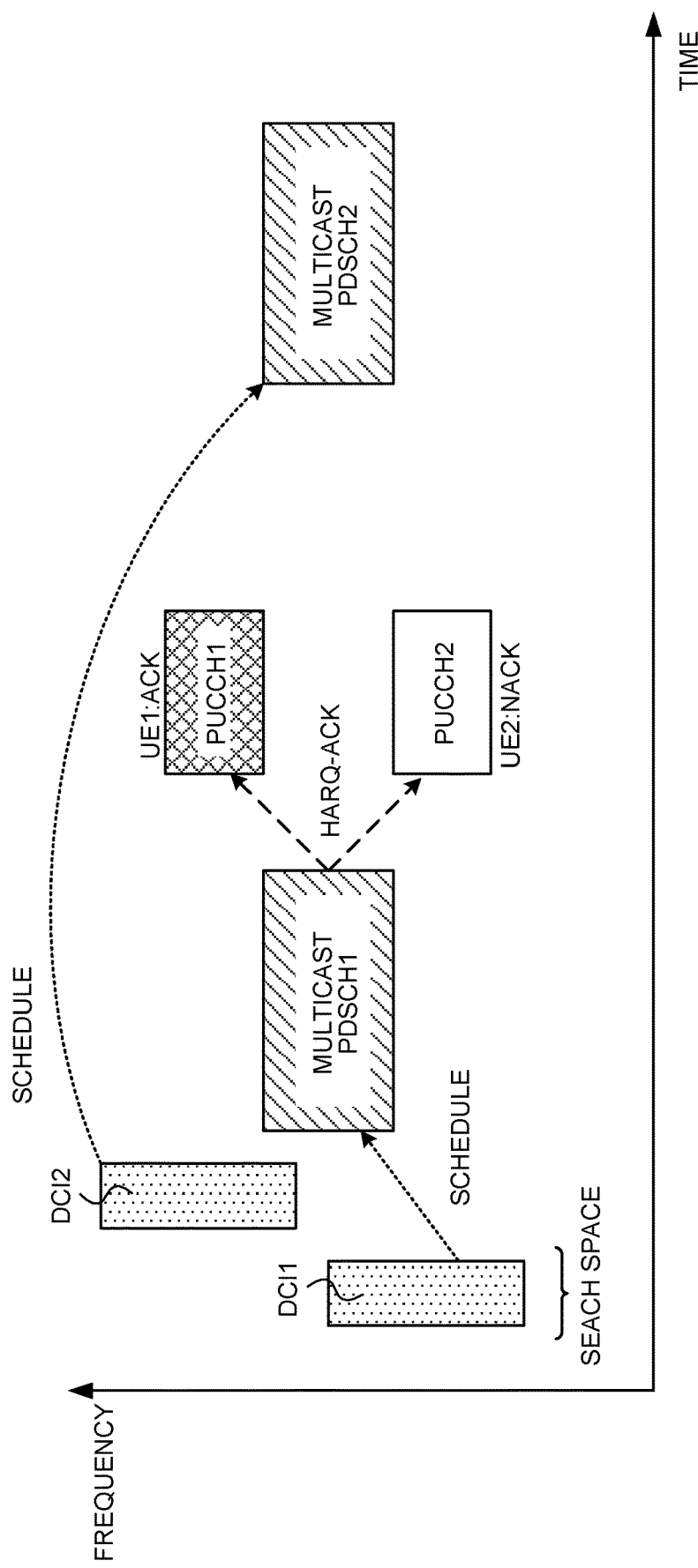
FIG. 6 is a diagram to show an example of the retransmission procedure of the multicast PDSCH.

In a case that the second and third embodiments are adopted, a case is assumed that the DCI for scheduling the retransmission multicast PDSCH (the second DCI) is notified before a determination on a result of the reception processing of the initial transmission multicast PDSCH (HARQ determination) (FIG. 6). In this case, at a time of receiving the second DCI, the NW and the UE cannot recognize whether or not the initial transmission multicast PDSCH is correctly received by the UE.

Additionally, if the second DCI is received always after the HARQ-ACK in response to the initial transmission multicast PDSCH is transmitted, a delay until retransmission completion is likely to be large.

In the following, in the present embodiment, a method for controlling an appropriate receiving timing of the second DCI will be described.

The UE may assume that the second DCI is transmitted after a specific time. Specifically, the UE may (assume to) receive the second DCI after the specific time after receiving the initial transmission multicast PDSCH.

The specific time may be determined based on a HARQ-ACK process time. The specific time may be a time after the HARQ-ACK process time elapses after receiving the multicast PDSCH. In the present disclosure, the HARQ-ACK process time may be a minimum time from receiving the PDSCH to transmitting the HARQ (PDSCH to HARQ transmission). The HARQ-ACK process time may be defined by the specifications, configured through higher layer signaling, or reported from the UE in the UE capability information.

The specific time may be integer times (M times) of a time resource (for example, symbol, slot, sub-slot), or T ms (T represents any value). The values M and T may be determined based on the HARQ-ACK process time. The values M and T may be predefined by the specifications, may be configured for the UE through higher layer signaling, or may be a value reported to the NW in the UE capability information.

This can control the multicast PDSCH retransmission in consideration of the UE detecting the HARQ-ACK for the initial transmission multicast PDSCH.

In the present disclosure, the specific time may be a time/offset separately notified through higher layer signaling. The specific time may be that obtained by adding/subtracting the time/offset notified through higher layer signaling to/from the above HARQ-ACK process time.

Figure 7:
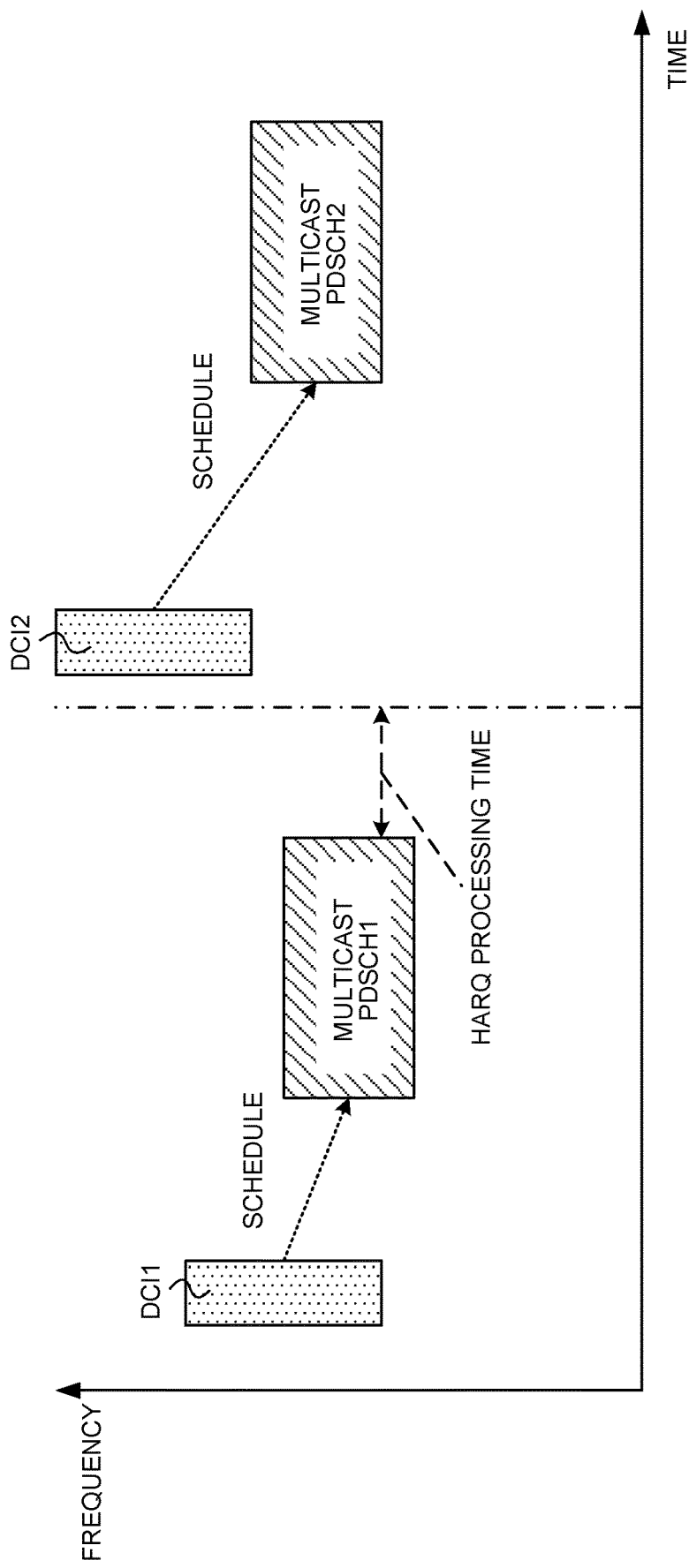
FIG. 7 is a diagram to show an example of a receiving timing of DCI for scheduling a retransmission multicast PDSCH.

FIG. 7 is a diagram to show an example of the receiving timing of the DCI for scheduling the retransmission multicast PDSCH. In FIG. 7, a plurality of UEs receive the initial transmission multicast PDSCH (multicast PDSCH 1) scheduled by the DCI 1. After that, the UE receives the retransmission multicast PDSCH (multicast PDSCH 2) scheduled by the DCI 2.

In FIG. 7, the UE receives the DCI 2 after the HARQ-ACK process time for the multicast PDSCH 1. In other words, the UE does not assume to receive the DCI 2 before the HARQ-ACK process time for the multicast PDSCH 1.

Note that the DCI, the PDSCH, the number of PUCCH resources, and time/frequency allocation positions shown in FIG. 7 are merely examples, and are not limited thereto. The DCI 1 and the DCI 2 in FIG. 7 may be UE-common DCI, or UE-specific DCI.

The UE may switch a behavior for monitoring the second DCI (reception, detection) based on whether or not a period for monitoring the second DCI is before or after a specific time. Note that the specific time may be the HARQ process time. The DCI monitoring period may be interpreted as a DCI measurement time, a DCI detection time, a search space/CORESET/monitoring occasion configured for monitoring the DCI, DCI reception period, and the like.

In a case that the receiving timing of the second DCI is before a specific time, the UE may measure the second DCI to perform blind detection. In a case that the receiving timing of the second DCI is after the specific time, the UE may determine whether to blind-detect the second DCI based on the result of the reception processing of the initial transmission multicast PDSCH.

Figure 8:
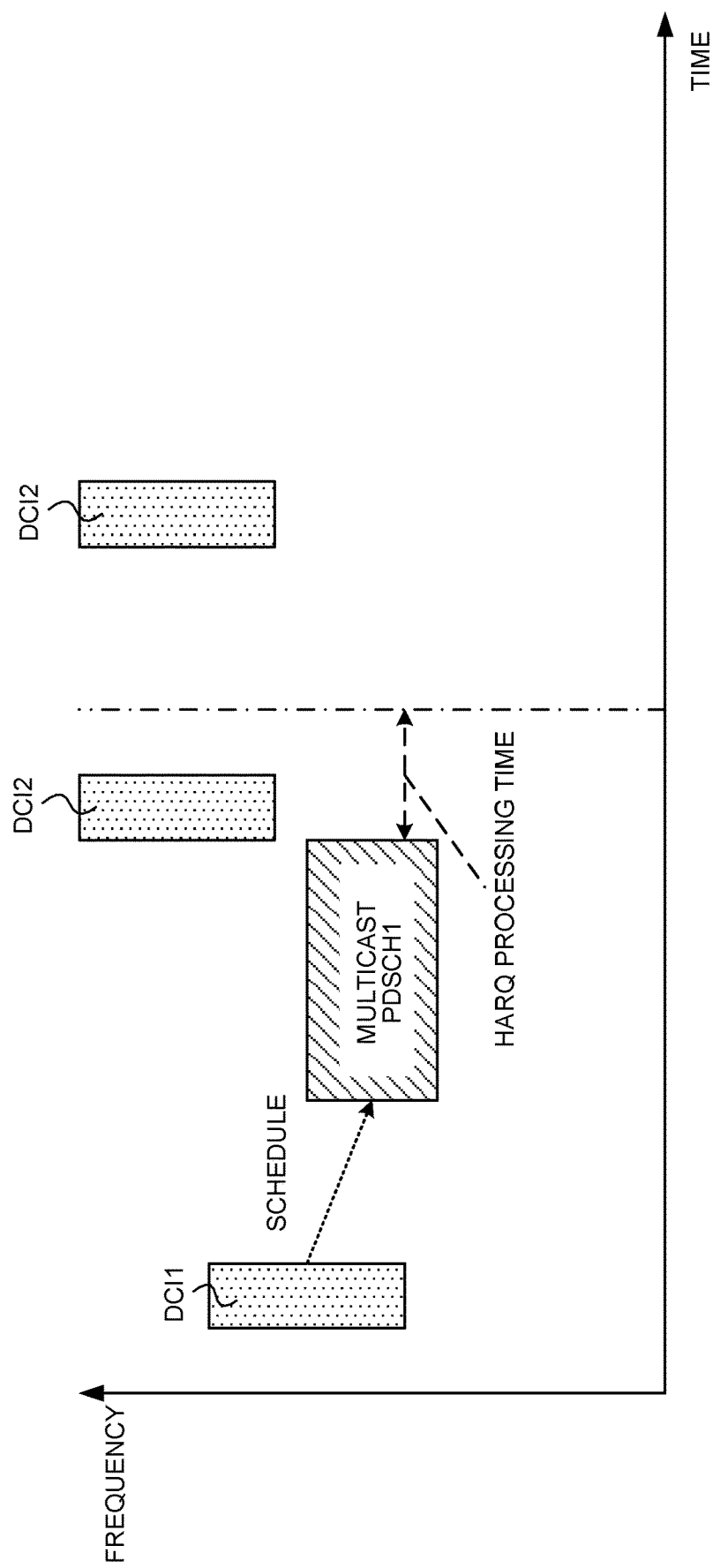
FIG. 8 is a diagram to show an example of the receiving timing of DCI for scheduling the retransmission multicast PDSCH.

In this case, the UE may not blind-detect the second DCI in the case of succeeding in the reception processing of the initial transmission multicast PDSCH, or may blind-detect the second DCI in the case of failing in the reception processing of the initial transmission multicast PDSCH (FIG. 8).

Note that in the example as shown in FIG. 8, the UE may be notified of the resource of the DCI 1 (at least one of a search space, a CORESET, and a monitoring occasion) and the resource of the DCI 2 through higher layer signaling. This arrows the UE to recognize that the initial transmission DCI resource is different from the retransmission DCI resource, and appropriately perform receiving control of the initial transmission/retransmission DCI.

As described above, according to the fourth embodiment, the flexible retransmission multicast PDSCH receiving control of the UE is possible, regardless of the receiving timing of the DCI for scheduling the retransmission multicast PDSCH.

Fifth Embodiment

In the present embodiment, a case that multicast PDSCH repetition is performed by way of one piece of DCI will be described.

In the present embodiment, the HARQ process ID of each multicast PDSCH may be identical. A redundancy version (RV) of each multicast PDSCH may be identical, or may be chanted based on a specific rule.

The number of repetitions of the multicast PDSCH may be predefined by the specifications, may be notified to (configured for) the UE through higher layer signaling, or may be a value reported to the NW in the UE capability information (UE capability) of the UE. In a case that the number of repetitions of the multicast PDSCH is configured from the NW to the UE, the UE may use the configured value, and in a case of not configured from the NW to the UE, the UE may use a specific value (for example, 4).

Figure 9:
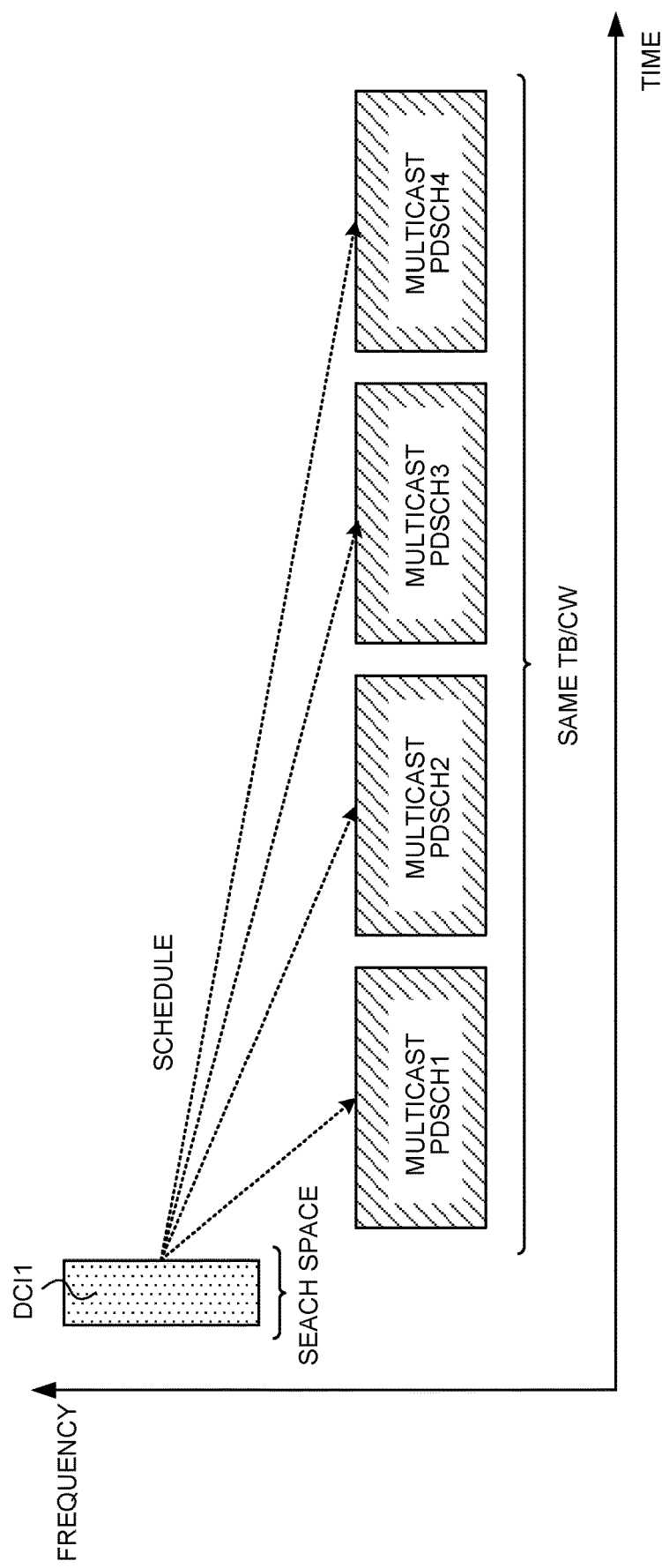
FIG. 9 is a diagram to show an example of multicast PDSCH repetition.

FIG. 9 is a diagram to show an example of the multicast PDSCH repetition. In FIG. 9, the UE receive multicast PDSCH repetition (multicast PDSCHs 1 to 4) scheduled by one piece of scheduling DCI (DCI 1). In FIG. 9, the number of repetitions of the multicast PDSCH is 4.

Note that the number of repetitions, the DCI, the number of PDSCH resources, and the time/frequency allocation positions shown in FIG. 9 are merely examples, and are not limited thereto. The DCI 1 in FIG. 9 is shown as a UE-common DCI, but may be a UE-specific DCI.

In the multicast PDSCH repetition, the frequency resources for the respective multicast PDSCHs may be different. The different frequency resources for the respective multicast PDSCHs can provide a frequency diversity effect.

For example, a plurality of candidates of the time/frequency resources for the respective multicast PDSCHs may be configured for the UE through higher layer signaling. Subsequently, the UE may determine the time/frequency resource for each multicast PDSCH from among the plurality of candidates, based on a specific field (for example, TDRA/FDRA field) included in the scheduling DCI for the multicast PDSCH.

The UE may be notified of a time/frequency offset value with respect to a time/frequency resource for a specific multicast PDSCH of a plurality of multicast PDSCHs to determine a time/frequency resource for a multicast PDSCH other than the specific multicast PDSCH based on the offset value. The scheduling DCI may indicate the time/frequency resource for the specific multicast PDSCH.

Note that the specific multicast PDSCH may be a multicast PDSCH initially transmitted among a plurality of multicast PDSCH, or a multicast PDSCH immediately before among a plurality of multicast PDSCH.

Figure 10:
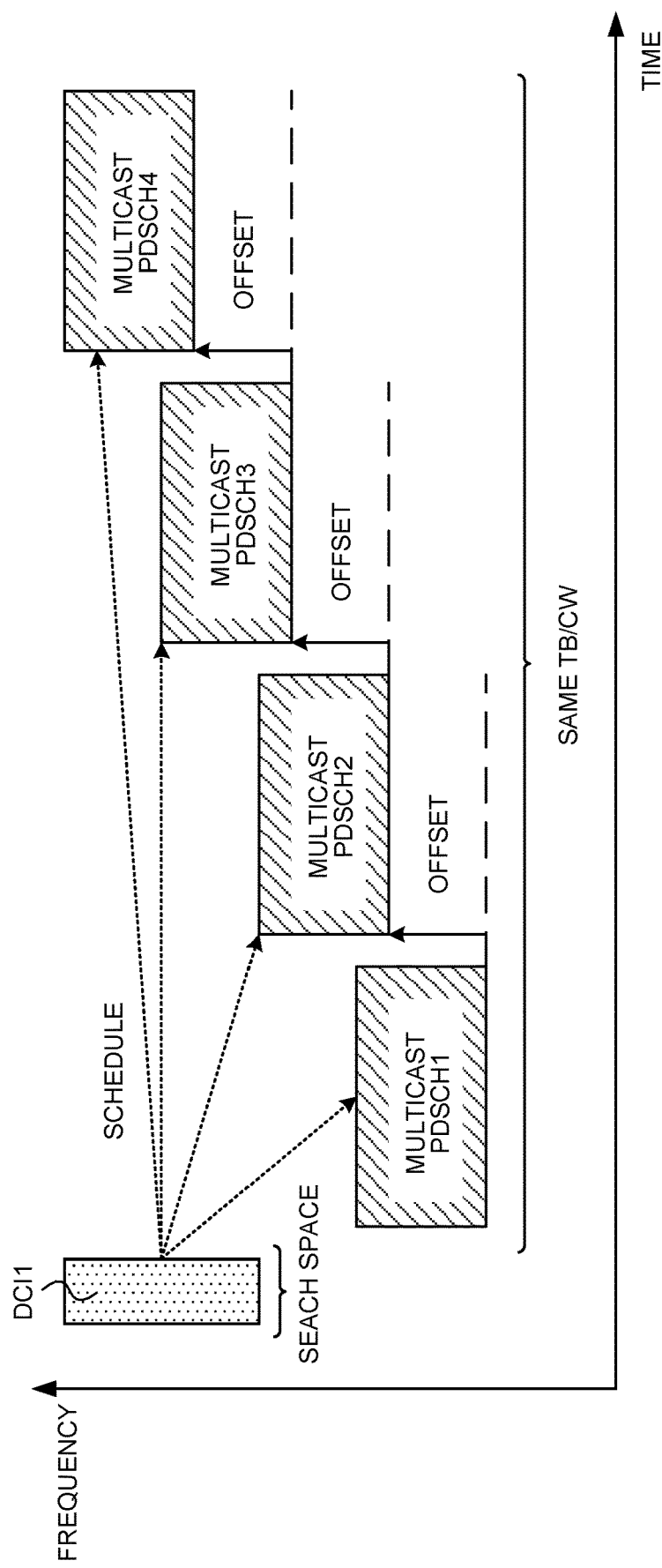
FIG. 10 is a diagram to show an example of the multicast PDSCH repetition.

FIG. 10 is a diagram to show an example of the multicast PDSCH repetition. In FIG. 10, the UE receive multicast PDSCH repetition (multicast PDSCHs 1 to 4) scheduled by one piece of scheduling DCI (DCI 1). In FIG. 10, the number of repetitions of the multicast PDSCH is 4.

In the example shown in FIG. 10, the UE is notified of the frequency offset value with respect to the multicast PDSCH immediately before, and the UE receives a plurality of multicast PDSCHs based on the offset value.

Note that the number of repetitions, the DCI, the number of PDSCH resources, and the time/frequency allocation positions shown in FIG. 10 are merely examples, and are not limited thereto. The DCI 1 in FIG. 10 is shown as a UE-common DCI, but may be a UE-specific DCI.

In the multicast PDSCH repetition, the TCI states to be applied to the respective multicast PDSCHs may be different. In other words, the UE may use different spatial domain filters to receive the respective multicast PDSCH. The different TCI states being applied to the respective multicast PDSCHs can provide a spatial diversity effect.

For example, a plurality of candidates of the TCI states to be applied to the respective multicast PDSCHs may be configured for the UE through higher layer signaling. Subsequently, the UE may determine the TCI state that is to be applied to each multicast PDSCH from among the plurality of candidates, based on a specific field included in the scheduling DCI for the multicast PDSCH.

The UE may determine the TCI state that is to be applied to each multicast PDSCH, based on a specific rule (beam cycle, beam cycling). A list of the plurality of TCI states for the beam cycle may be predefined by the specifications, or notified to (configured for) the UE through higher layer signaling. The TCI state applied to an initial multicast PDSCH (initial TCI state) may be notified to the UE.

The beam cycle (beam cycling) may refer to that the list of a plurality of TCI states are cyclically applied to a plurality of signals/channels (for example, PDSCHs).

Figure 11:
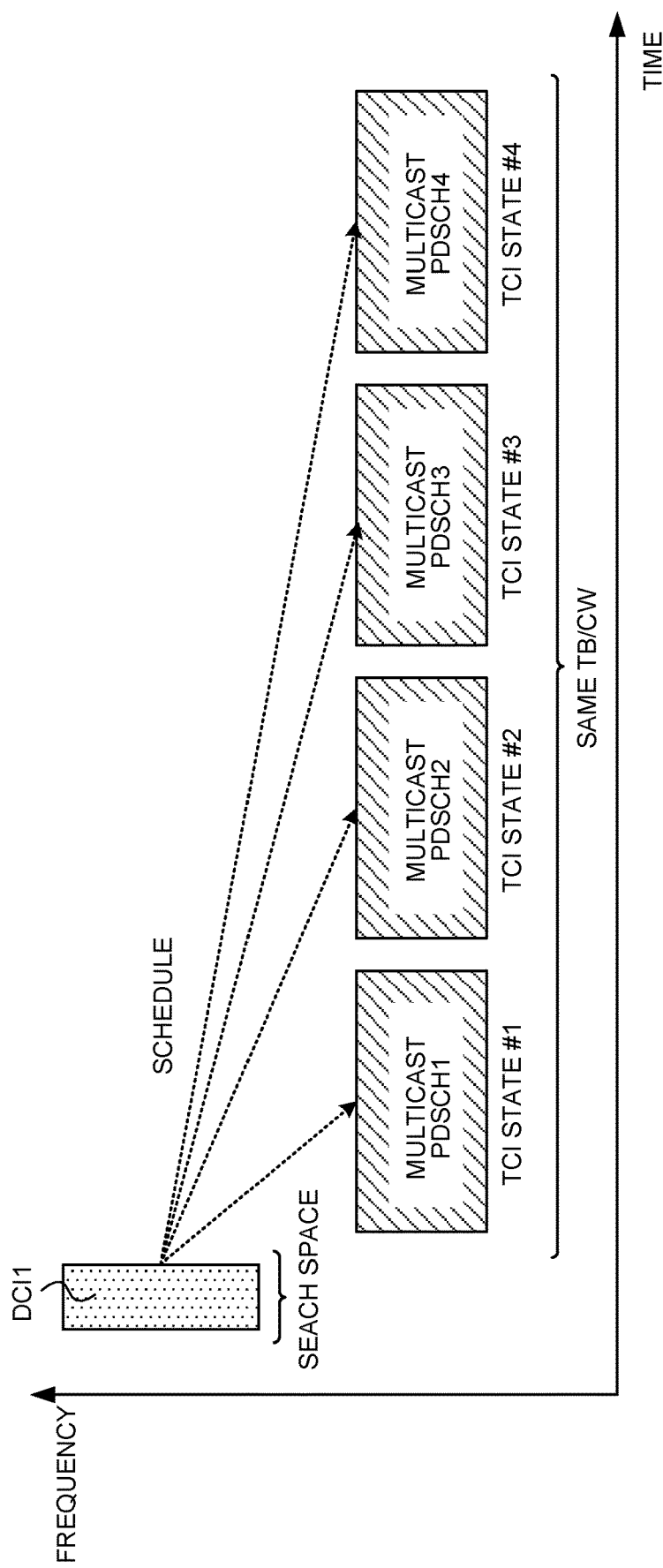
FIG. 11 is a diagram to show an example of the multicast PDSCH repetition.

FIG. 11 is a diagram to show an example of the multicast PDSCH repetition. In FIG. 11, the UE receive multicast PDSCH repetition (multicast PDSCHs 1 to 4) scheduled by one piece of scheduling DCI (DCI 1). In FIG. 11, the number of repetitions of the multicast PDSCH is 4.

In the example shown in FIG. 11, the UE is configured with an order of TCI state #1, TCI state #2, TCI state #3, and TCI state #4 as the beams, and notified of TCI state #1 being applied to the initial multicast PDSCH. The UE receives a plurality of multicast PDSCH, based on the cycle and the initial TCI state.

Note that the number of repetitions, the DCI, the number of PDSCH resources, and the time/frequency allocation positions, the TCI states, the cycle of the TCI states, and the initial TCI cycle shown in FIG. 11 are merely examples, and are not limited thereto. The DCI 1 in FIG. 11 is shown as a UE-common DCI, but may be a UE-specific DCI.

In the following, the HARQ-ACK transmission by the UE in response to the multicast PDSCH repetition will be described.

The UE may not transmit the HARQ-ACK in response to the multicast PDSCH repetition.

The UE may transmit the HARQ-ACK in response to the multicast PDSCH repetition.

For example, the UE may transmit the HARQ-ACK in response to the multicast PDSCH repetition by using one HARQ-ACK transmission PUCCH/PUSCH resource. In this case, the UE, in the case of succeeding in the reception processing of at least one multicast PDSCH, may transmit the ACK. The UE, in the case of failing in the reception processing of all the multicast PDSCHs, may transmit the NACK.

In this case, the HARQ-ACK transmission PUCCH/PUSCH resource may be assigned after the last symbol of the last multicast PDSCH.

Figure 12:
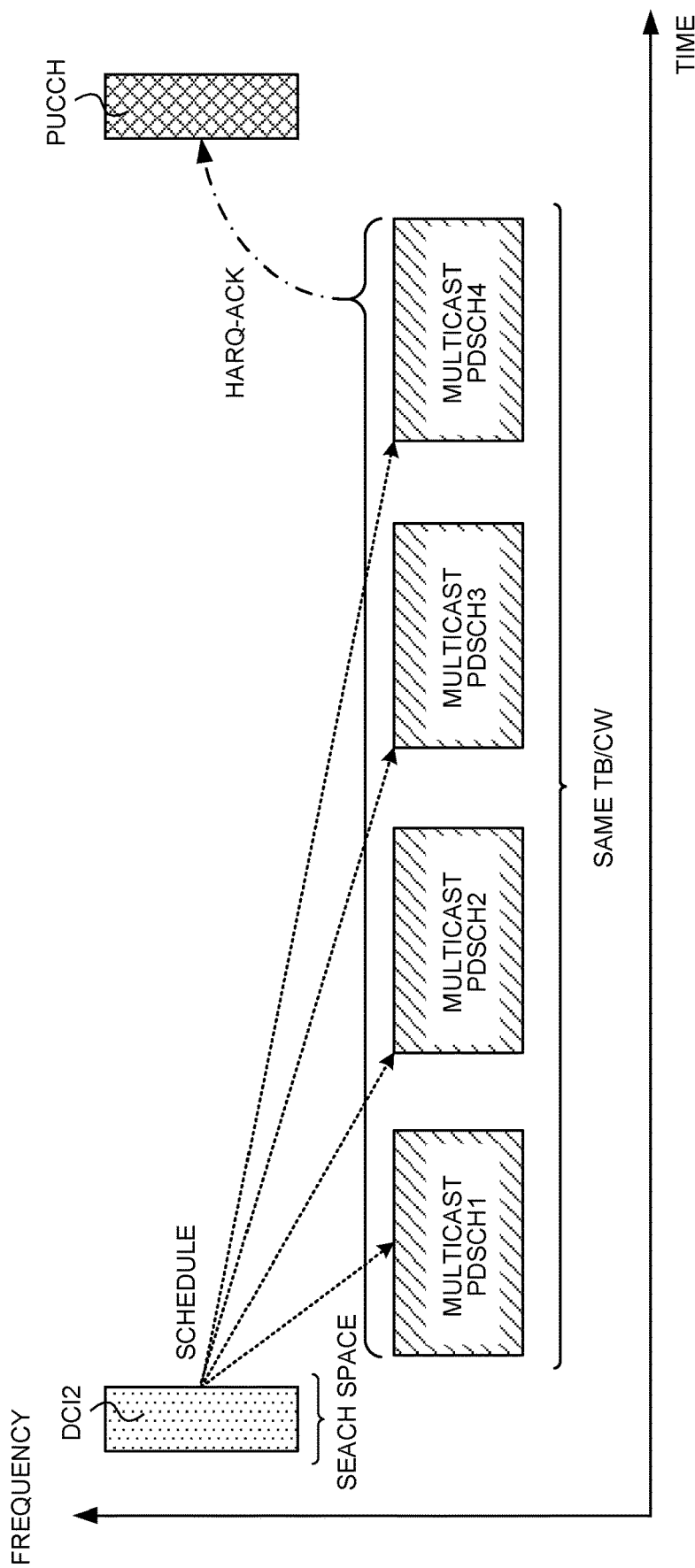
FIG. 12 is a diagram to show an example of HARQ-ACK transmission in response to multicast PDSCH repetition.

FIG. 12 is a diagram to show an example of the HARQ-ACK transmission in response to the multicast PDSCH repetition. Structures of the scheduling DCI and respective multicast PDSCHs shown in FIG. 12 are the same as in FIG. 9. The UE transmits the HARQ-ACK (ACK/NACK) in response to the multicast PDSCH repetition by using the PUCCH resource.

Note that the number of repetitions, the DCI, the PDSCH, the number of PUCCH resources, and the time/frequency allocation positions shown in FIG. 12 are merely examples, and are not limited thereto. The DCI 1 in FIG. 12 is shown as a UE-common DCI, but may be a UE-specific DCI. The HARQ-ACK transmission resource in FIG. 12 is a PUCCH resource, but may be a PUSCH resource.

Additionally, for example, the UE may transmit the HARQ-ACK in response to the multicast PDSCH repetition by using the HARQ-ACK transmission PUCCH/PUSCH resource configured for each multicast PDSCH.

In this case, the UE may perform the reception processing of each multicast PDSCH, and may transmit an ACK in response to a multicast PDSCH of which the reception processing is firstly succeeded, by using the HARQ-ACK transmission resource with respect to the multicast PDSCH.

On the other hand, the UE may perform the reception processing of each multicast PDSCH, and may not transmit a HARQ-ACK in response to a multicast PDSCH of which the reception processing is failed. The UE may perform the reception processing of each multicast PDSCH, and may transmit a NACK in response to a multicast PDSCH of which the reception processing is failed, by using the HARQ-ACK transmission resource with respect to the multicast PDSCH.

In a case that the UE succeeds in the reception processing of at least one multicast PDSCH, the UE may not transmit the HARQ-ACK in response to the multicast PDSCH that is received after a multicast PDSCH of which the reception processing is firstly succeeded. This can avoid unnecessary power consumption of the UE.

In the case that the UE succeeds in the reception processing of at least one multicast PDSCH, the UE may transmit, regardless of a result of the reception processing of the multicast PDSCH (subsequent multicast PDSCH) that is received after a multicast PDSCH of which the reception processing is firstly succeeded, an ACK in response to the subsequent multicast PDSCH. This can avoid an error of the NW, and thus, communication reliability can be improved.

In the case that the UE succeeds in the reception processing of at least one multicast PDSCH, the UE may transmit, regardless of a result of the reception processing of the subsequent multicast PDSCH, an ACK in response to the subsequent multicast PDSCH as much as specific times. The number of times to transmit the ACK may be a total N of the number of times to transmit the ACK in response to the multicast PDSCH of which the reception processing is firstly succeeded and the number of times to transmit the ACK in response to the subsequent multicast PDSCH.

The total N may be predefined by the specifications, may be notified to (configured for) the UE through higher layer signaling, or may be a value reported to the NW in the UE capability information (UE capability) of the UE.

A specific RV value may be applied to the multicast PDSCH. The specific RV value may be applied to at least the multicast PDSCH initially received. The specific RV value may be a self-decodable RV. The self-decodable RV may be a specific RV (for example, RV=0, 3). Reception by the UE of the multicast PDSCH to which the self-decodable RV is applied can increase a probability capable of decoding based on the PUSCH to which the RV is applied. For example, the specific RV value may be 0, or 0 and 3.

Figure 13:
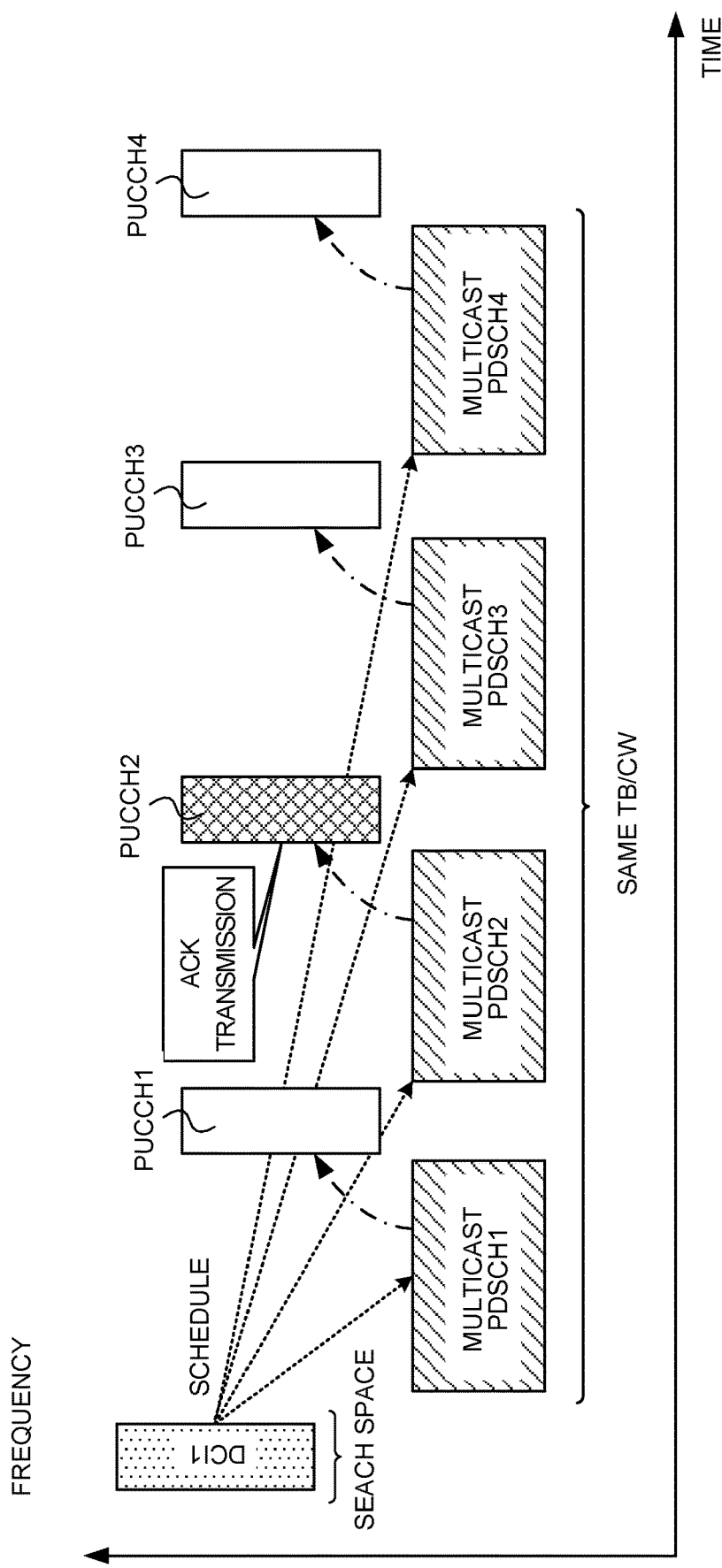
FIG. 13 is a diagram to show an example of the HARQ-ACK transmission in response to the multicast PDSCH repetition.

FIG. 13 is a diagram to show an example of the HARQ-ACK transmission in response to the multicast PDSCH repetition. Structures of the scheduling DCI and respective multicast PDSCHs shown in FIG. 13 are the same as in FIG. 9. The UE transmits the HARQ-ACK (ACK/NACK) in response to the multicast PDSCH repetition by using the PUCCH resource with respect to the multicast PDSCH. The PUCCHs 1 to 4 are the HARQ-ACK transmission resources with respect to the multicast PDSCHs 1 to 4, respectively.

In the example shown in FIG. 13, a UE fails in the reception processing of the multicast PDSCH 1. The UE does not transmit the HARQ-ACK (or may transmit the NACK) in response to the multicast PDSCH 1. Subsequently, the UE succeeds in the reception processing of the multicast PDSCH 1. The UE transmits the HARQ-ACK (ACK) in response to the multicast PDSCH 2 by using the PUCCH 2.

Further, the UE transmits (or may not transmit), regardless of results of the reception processing of the multicast PDSCHs 3 and 4 that are transmitted after the multicast PDSCH 2, the ACK in response to each of the multicast PDSCHs 3 and 4.

Note that the number of repetitions, the DCI, the PDSCH, the number of PUCCH resources, and the time/frequency allocation positions shown in FIG. 13 are merely examples, and are not limited thereto. The DCI 1 in FIG. 13 is shown as a UE-common DCI, but may be a UE-specific DCI. The HARQ-ACK transmission resource in FIG. 13 is a PUCCH resource, but may be a PUSCH resource.

In the following, a spatial domain filter (UL beam, UL spatial relation) applied to the transmission of the HARQ-ACK in response to the multicast PDSCH will be described. Note that a method for determining the spatial domain filter described below may be applied to the HARQ-ACK in at least one of the first to fourth embodiments described above.

In the case that the UE transmits the HARQ-ACK in response to the multicast PDSCH repetition by using one HARQ-ACK transmission PUCCH/PUSCH resource (that is the case shown in the example in FIG. 12), the UE may use a specific spatial domain filter (UL beam) to transmit the HARQ-ACK.

The spatial domain filter may be notified to (configured for, indicated to) the UE through at least one of higher layer signaling (for example, RRC signaling), MAC signaling, and physical layer signaling (for example, DCI). Specifically, the UE may use at least either a spatial domain filter indicated by the configured PUSCH/PUCCH spatial relation information (SRI) or a spatial domain filter corresponding to the PUSCH/PUCCH spatial relation to transmit the HARQ-ACK in response to the multicast PDSCH repetition.

The specific spatial domain filter may be a spatial domain filter corresponding to a default spatial relation defined in Rel. 16.

The specific domain filter may be a spatial domain filter corresponding to a spatial domain filter (DL beam) applied to a plurality of multicast PDSCHs. In this case, the spatial domain filter applied to the HARQ-ACK in response to the multicast PDSCH repetition may be a spatial domain filter applied to an initially received multicast PDSCH. The spatial domain filter applied to the HARQ-ACK in response to the multicast PDSCH repetition may be a spatial domain filter applied to a lastly received multicast PDSCH.

Additionally, for example, in a case that the UE transmits the HARQ-ACK in response to the multicast PDSCH repetition by using the HARQ-ACK transmission PUCCH/PUSCH resource configured for each multicast PDSCH (that is the case shown in the example in FIG. 13), the UE may use the specific spatial domain filter (UL beam) to transmit the HARQ-ACK.

In the following, the specific spatial domain filter will be described, where the specific spatial domain filter applied to each HARQ-ACK may be common to respective HARQ-ACKs, or may be individually determined for each HARQ-ACK.

The spatial domain filter may be notified to (configured for, indicated to) the UE through at least one of higher layer signaling (for example, RRC signaling), MAC signaling, and physical layer signaling (for example, DCI). Specifically, the UE may use at least either a spatial domain filter indicated by the configured PUSCH/PUCCH SRI or a spatial domain filter corresponding to the PUSCH/PUCCH spatial relation to transmit the HARQ-ACK in response to the multicast PDSCH repetition.

The specific spatial domain filter may be a spatial domain filter corresponding to a default spatial relation defined in Rel. 16.

The specific domain filter may be a spatial domain filter corresponding to a spatial domain filter (DL beam) applied in common to a plurality of multicast PDSCHs. In this case, the spatial domain filter applied to the HARQ-ACK in response to the multicast PDSCH repetition may be a spatial domain filter applied to an initially received multicast PDSCH. The spatial domain filter applied to the HARQ-ACK in response to the multicast PDSCH repetition may be a spatial domain filter applied to a lastly received multicast PDSCH.

The specific domain filter may be a spatial domain filter (DL beam) applied to each multicast PDSCH corresponding to the HARQ-ACK.

The specific domain filter may be a spatial domain filter corresponding to a spatial domain filter (DL beam) for the multicast PDSCH of which the reception processing is lastly succeeded. In this case, the UE may apply the spatial domain filter corresponding to the spatial domain filter for the multicast PDSCH of which the reception processing is succeeded to transmission of a HARQ-ACK in response to a subsequent multicast PDSCH.

As described above, according to the fifth embodiment, lower latency and lower overhead for PDCCH can be attained, and thus, higher reliable multicast PDSCH reception is possible.

Sixth Embodiment

As for at least one of parameters included in the higher layer (RRC) parameters (at least one of PDSCH configuration (PDSCH-Config), PUCCH configuration (PUCCH-Config), and PUSCH configuration (PUSCH-Config)), each of a unicast parameter and a multicast parameter may be notified to the UE. For example, the UE may receive each of a unicast parameter and a multicast parameter for the TDRA and the FDRA included in the PDSCH configuration.

Note that the present embodiment may be applied to at least one of the first to fifth embodiments described above.

Note that the higher layer parameters in the present disclosure may be interpreted as a higher layer parameter list, a higher layer parameter set, a higher layer parameter table, and the like.

The UE may assume that the DCI detected in the multicast resource (for example, CORESET, search space, and monitoring occasion) refers to the higher layer parameters configured for multicast, or may assume that other DCI refer to the higher layer parameters configured for unicast.

The UE may assume that the DCI to which the multicast DCI format is applied refers to the higher layer parameters configured for multicast, or may assume that other DCI refer to the higher layer parameters configured for unicast.

The UE may assume that the DCI CRC-scrambled with a multicast RNTI refers to the higher layer parameters configured for multicast, or may assume that other DCI refer to the higher layer parameters configured for unicast.

Figure 14:
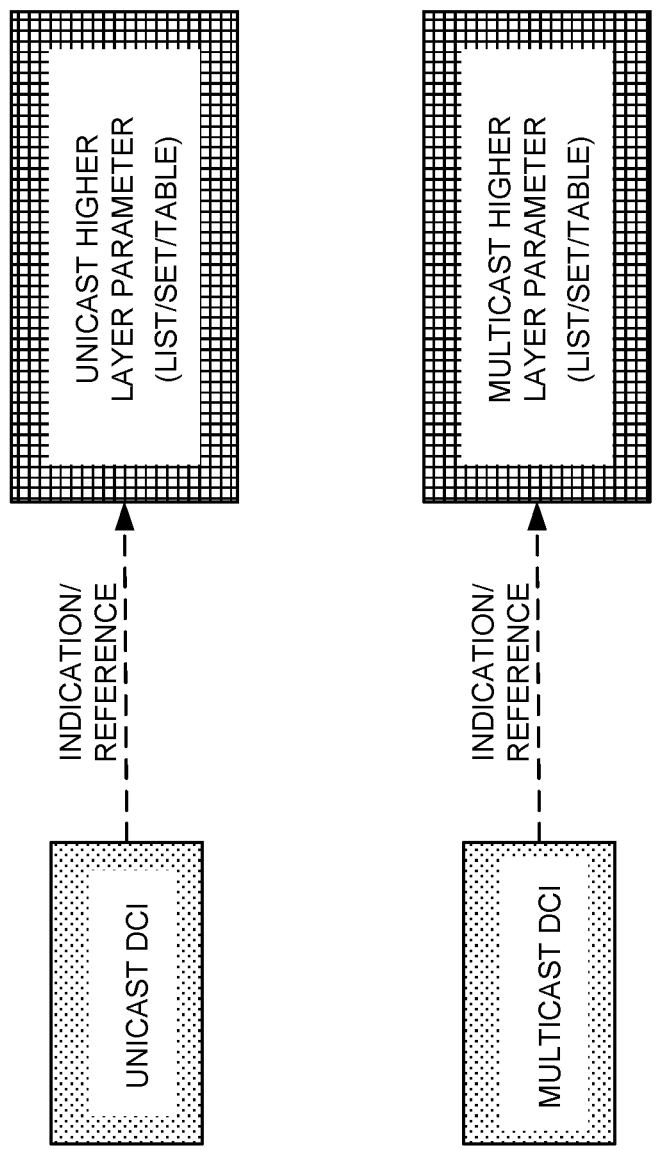
FIG. 14 is a diagram to show an example of unicast DCI and multicast DCI referring to higher layer parameters.

FIG. 14 is a diagram to show an example of the unicast DCI and the multicast DCI referring to the higher layer parameters. In FIG. 14, the UE assumes that the unicast DCI refers to the higher layer parameter list configured for unicast, and assumes that the multicast DCI refers to the higher layer parameter list configured for multicast.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
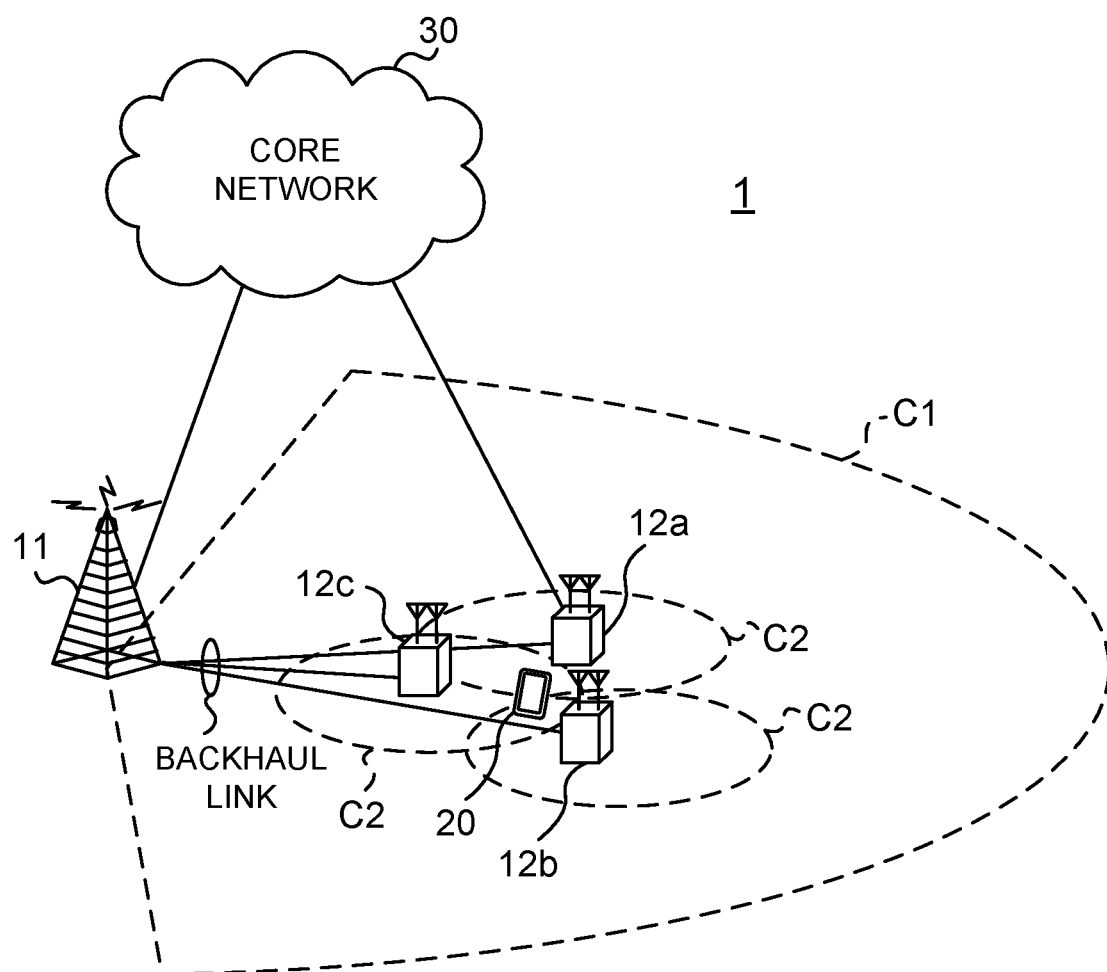
FIG. 15 is a diagram to show an example of a schematic structure of a radio communication system according to one embodiment.

FIG. 15 is a diagram to show an example of a schematic structure of the radio communication system according to one embodiment. A radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 16:
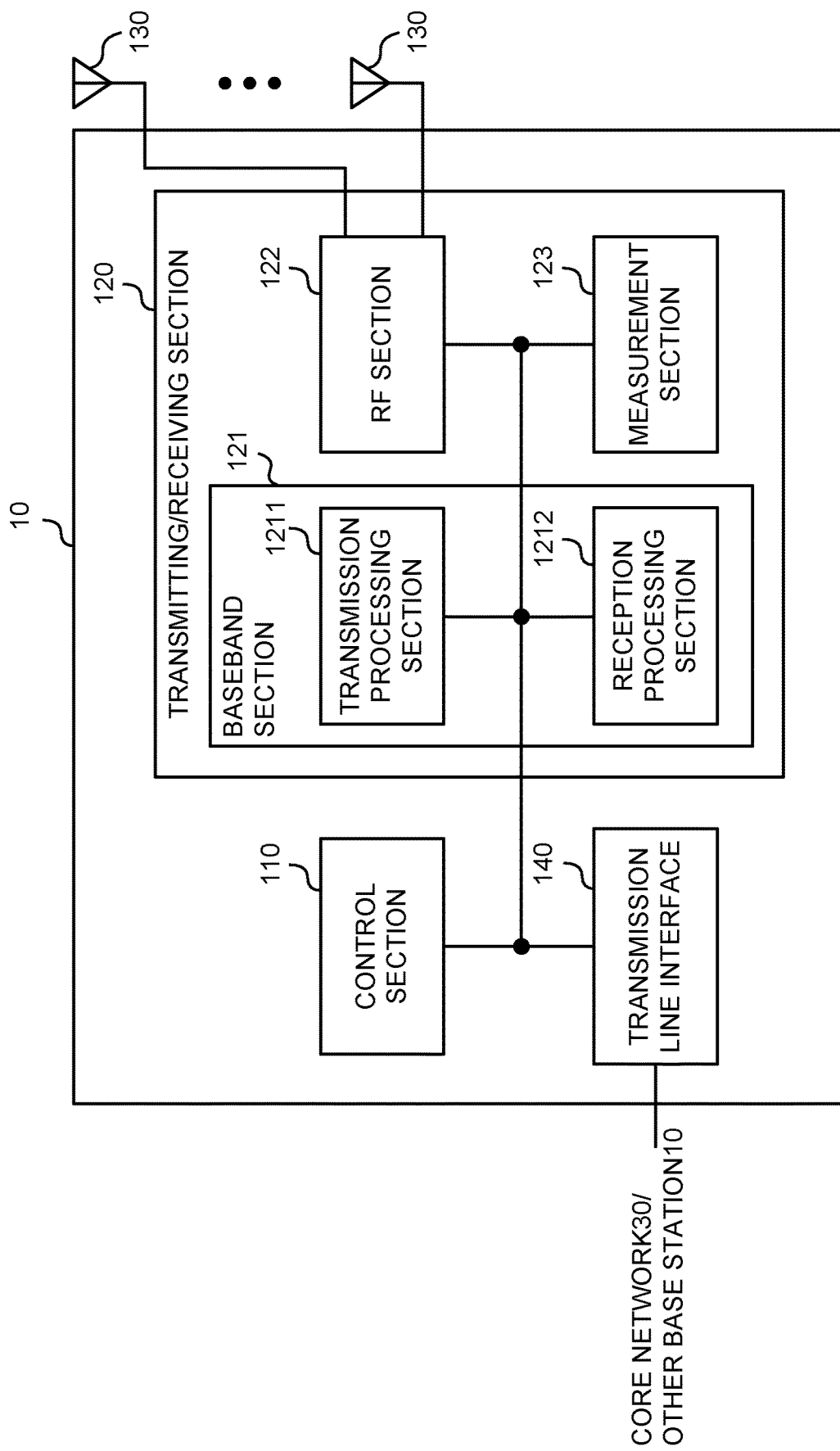
FIG. 16 is a diagram to show an example of a structure of a base station according to one embodiment.

FIG. 16 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can include a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may include a transmitting section and a receiving section. The transmitting section may include the transmission processing section 1211, and the RF section 122. The receiving section may include the reception processing section 1212, the RF section 122, and the measurement section 123.

The transmitting/receiving antennas 130 can include antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may include at least one of the transmitting/receiving section 120, the transmitting/receiving antennas 130, and the communication path interface 140.

The transmitting/receiving section 120 may transmit an initial transmission of downlink (DL) data to be multicasted. The control section 110 may control a retransmission of the DL data to be multicasted based on a result of decoding the DL data (the second embodiment).

The transmitting/receiving section 120 may transmit an initial transmission of downlink (DL) data, the DL data being scheduled based on first downlink control information (DCI) and multicasted. The control section 110 may control a retransmission of the DL data based on a result of decoding the initial transmission, the DL data being scheduled based on second DCI and unicasted (the third embodiment).

The transmitting/receiving section 120 may transmit downlink (DL) data, the DL data being scheduled by one piece of downlink control information (DCI) and multicasted on a plurality of occasions. The control section 110 may control a reception of Hybrid Automatic Repeat reQuest ACKnowledgement (HARQ-ACK) information with respect to the DL data, based on the DCI (the fifth embodiment).

(User Terminal)

Figure 17:
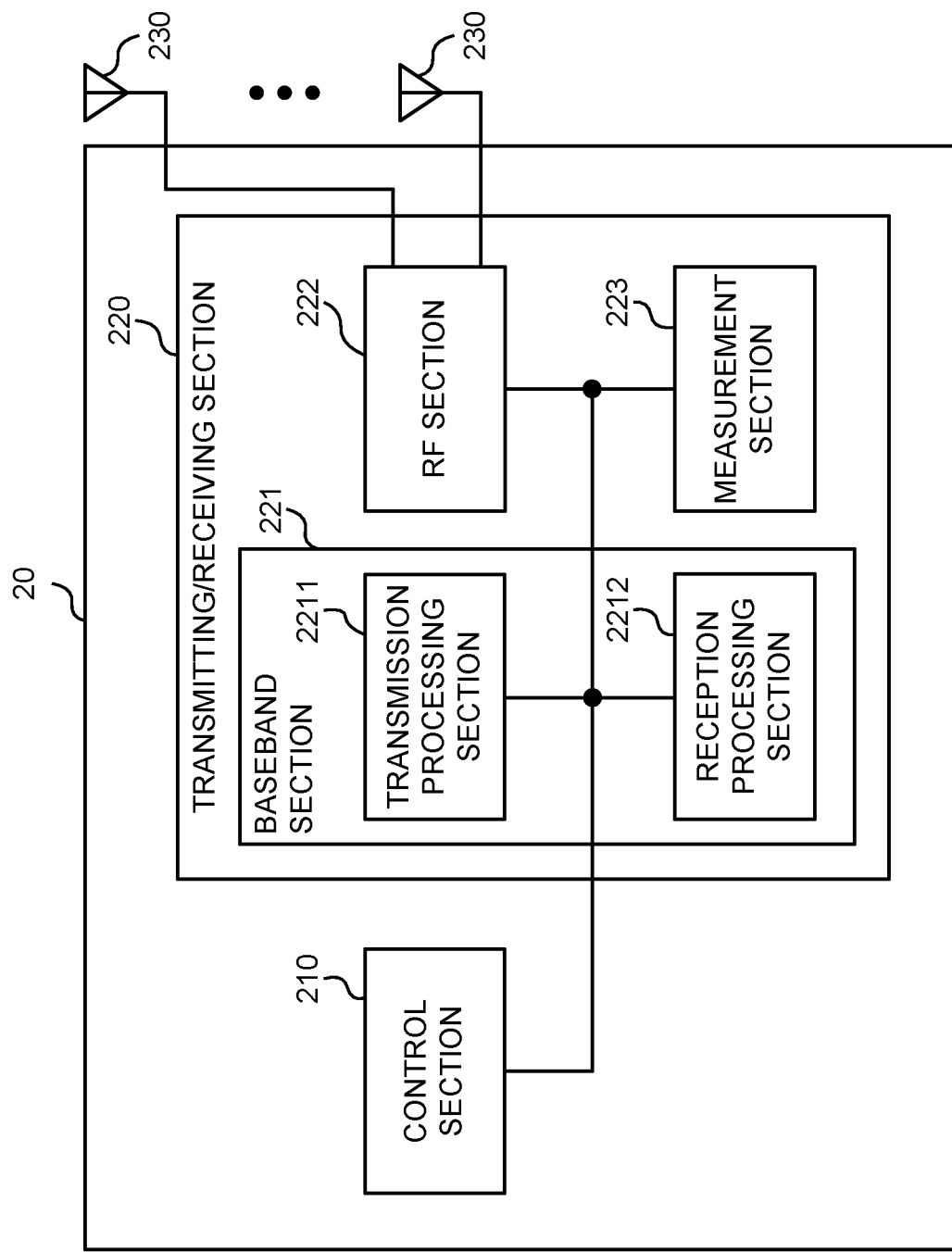
FIG. 17 is a diagram to show an example of a structure of a user terminal according to one embodiment.

FIG. 17 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can include a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may include a transmitting section and a receiving section. The transmitting section may include the transmission processing section 2211, and the RF section 222. The receiving section may include the reception processing section 2212, the RF section 222, and the measurement section 223.

The transmitting/receiving antennas 230 can include antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may include at least one of the transmitting/receiving section 220 and the transmitting/receiving antennas 230.

The transmitting/receiving section 220 may receive an initial transmission of downlink (DL) data to be multicasted. The control section 210 may control a reception of the DL data to be multicasted based on a result of decoding the DL data (the second embodiment).

The control section 210 may perform control for, in a case of succeeding in decoding the DL data, not transmitting Hybrid Automatic Repeat reQuest ACKnowledgement (HARQ-ACK) information with respect to the initial transmission (the second embodiment).

The control section 210 may perform control for, in a case of succeeding in decoding the DL data, transmitting Hybrid Automatic Repeat reQuest ACKnowledgement (HARQ-ACK) information indicating a positive acknowledgement with respect to the initial transmission (the second embodiment).

The transmitting/receiving section 220 may receive downlink control information including information relating to a resource for a downlink shared channel (PDSCH) carrying the initial transmission and information relating to a resource for a PDSCH carrying the retransmission (the second embodiment).

The transmitting/receiving section 220 may receive an initial transmission of downlink (DL) data, the DL data being scheduled based on first downlink control information (DCI) and multicasted. The control section 210 may control reception of a retransmission of the DL data based on a result of decoding the initial transmission, the DL data being scheduled based on second DCI and unicasted (the third embodiment).

The transmitting/receiving section 220 may receive the second DCI when and after a specific time elapses from a receiving timing of the initial transmission (the fourth embodiment).

The control section 210 may control blind detection of the second DCI based on a receiving timing of the second DCI (the fourth embodiment).

The transmitting/receiving section 220 may receive downlink (DL) data, the DL data being scheduled by one piece of downlink control information (DCI) and multicasted on a plurality of occasions. The control section 210 may control a transmission of Hybrid Automatic Repeat reQuest ACKnowledgement (HARQ-ACK) information with respect to the DL data, based on the DCI (the fifth embodiment).

The control section 210 may perform controls for not transmitting the HARQ-ACK information (the fifth embodiment).

The control section 210, in a case of succeeding in reception processing of the DL data on at least one occasion of the plurality of occasions, may transmit the HARQ-ACK information indicating one positive acknowledgement with respect to the DL data (the fifth embodiment).

The control section 210, in a case of succeeding in reception processing of the DL data on at least one occasion of the plurality of occasions, may perform control for transmitting the HARQ-ACK information with respect to the DL data by using a HARQ-ACK resource corresponding to an initial occasion of the at least one occasion of the plurality of occasions (the fifth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 18:
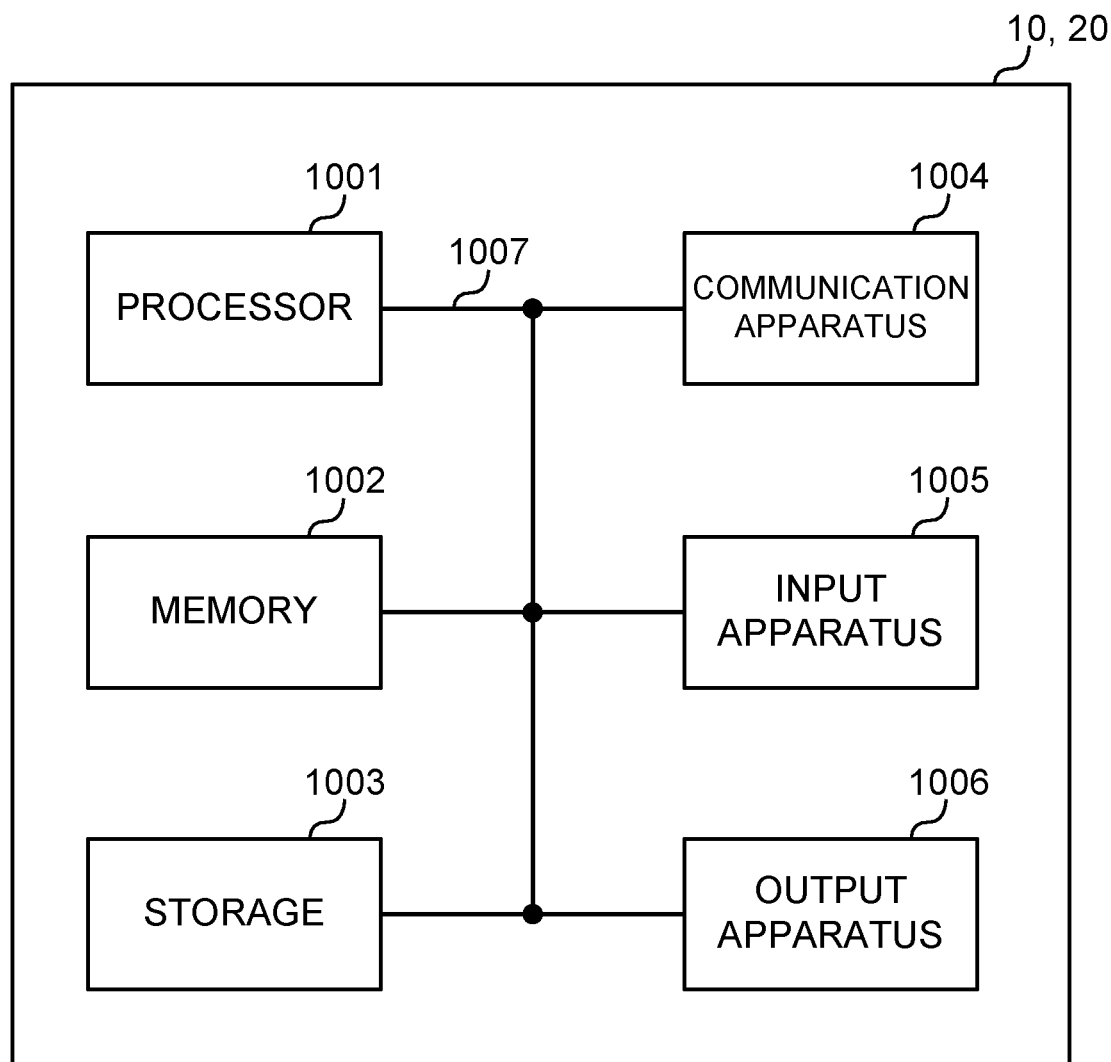
FIG. 18 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 18 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may include one or a plurality of periods (frames) in the time domain. Each of one or a plurality of periods (frames) constituting a radio frame may be referred to as a "subframe." Furthermore, a subframe may include one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may include one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may include one or a plurality of symbols in the time domain. A mini-slot may be referred to as a "sub-slot." A mini-slot may include symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may include one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may include one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), x-th generation mobile communication system (xG) (xG (x represent an integer, a decimal, for example)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives an initial transmission of a physical downlink shared channel (PDSCH) that is scheduled using first downlink control information (DCI); and
a processor that controls reception of second DCI scheduling a retransmission of the PDSCH, based on a result of decoding the initial transmission of the PDSCH and a timing at which the second DCI is detected,
wherein the processor controls reception of the retransmission of the PDSCH, based on whether the second DCI is received,
wherein the processor switches an operation of the reception of the second DCI, and controls whether or not to receive the second DCI, based on whether the timing at which the second DCI is transmitted is before or after a given timing,
wherein the processor controls to receive the second DCI when the decoding of the initial PDSCH fails and the second DCI is detected after the given timing, and
wherein the initial transmission of the PDSCH is multicasted, and the retransmission of the PDSCH is unicasted.

2. The terminal according to claim 1, wherein different DCI formats are applied to the first DCI and the second DCI, respectively.

3. The terminal according to claim 1, wherein when the PDSCH is successfully decoded, the processor controls not to transmit hybrid automatic repeat request acknowledgement (HARQ-ACK) information indicating a positive acknowledgement in response to the initial transmission of the PDSCH.

4. The terminal according to claim 1, wherein when the PDSCH is successfully decoded, the processor controls to transmit hybrid automatic repeat request acknowledgement (HARQ-ACK) information indicating a positive acknowledgement in response to the initial transmission of the PDSCH.

5. The terminal according to claim 1, wherein different radio network temporary identifiers (RNTIs) are used for the first DCI and the second DCI, respectively.

6. A radio communication method for a terminal, comprising:
receiving an initial transmission of a physical downlink shared channel (PDSCH) that is scheduled using first downlink control information (DCI);
controlling reception of second DCI scheduling a retransmission of the PDSCH, based on a result of decoding the initial transmission of the PDSCH and a timing at which the second DCI is detected; and
controlling reception of the retransmission of the PDSCH, based on whether the second DCI is received,
wherein the terminal switches an operation of the reception of the second DCI, and controls whether or not to receive the second DCI, based on whether the timing at which the second DCI is transmitted is before or after a given timing,
wherein the terminal controls to receive the second DCI when the decoding of the initial PDSCH fails and the second DCI is detected after the given timing, and
wherein the initial transmission of the PDSCH is multicasted, and the retransmission of the PDSCH is unicasted.

7. A system comprising a terminal and a base station, wherein
the terminal comprises:
a receiver that receives an initial transmission of a physical downlink shared channel (PDSCH) that is scheduled using first downlink control information (DCI); and
a processor that controls reception of second DCI scheduling a retransmission of the PDSCH, based on a result of decoding the initial transmission of the PDSCH and a timing at which the second DCI is detected,
wherein the processor controls reception of the retransmission of the PDSCH, based on whether the second DCI is received,
wherein the processor controls to receive the second DCI when the decoding of the initial PDSCH fails and the second DCI is detected after the given timing, and
wherein the processor switches an operation of the reception of the second DCI, and controls whether or not to receive the second DCI, based on whether the timing at which the second DCI is transmitted is before or after a given timing, and
the base station comprises:
a transmitter that transmits the initial transmission of the PDSCH; and
a processor that controls transmission of the retransmission of the PDSCH, based on the result of decoding the initial transmission of the PDSCH,
wherein the initial transmission of the PDSCH is multicasted, and the retransmission of the PDSCH is unicasted.

* * * * *